(12) United States Patent
Clevenger

(10) Patent No.: US 8,601,449 B2
(45) Date of Patent: Dec. 3, 2013

(54) CROSS-PLATFORM APPLICATION FRAMEWORK

(75) Inventor: Nathan J. Clevenger, Burnsville, MN (US)

(73) Assignee: ITR Group, Inc., Mendota Heights, MN (US)

( * ) Notice: Subject to any disclaimer, the term of this patent is extended or adjusted under 35 U.S.C. 154(b) by 305 days.

(21) Appl. No.: 13/088,172

(22) Filed: Apr. 15, 2011

(65) Prior Publication Data

US 2011/0258595 A1 Oct. 20, 2011

Related U.S. Application Data

(60) Provisional application No. 61/324,672, filed on Apr. 15, 2010.

(51) Int. Cl.
*G06F 9/44* (2006.01)
*G06F 9/45* (2006.01)

(52) U.S. Cl.
USPC ........... 717/140; 717/104; 717/108; 717/145; 717/148; 717/151

(58) Field of Classification Search
None
See application file for complete search history.

(56) References Cited

U.S. PATENT DOCUMENTS

| | | | |
|---|---|---|---|
| 7,096,491 B2 * | 8/2006 | Cheng | 726/4 |
| 7,305,671 B2 * | 12/2007 | Davidov et al. | 717/172 |
| 7,587,712 B2 * | 9/2009 | Mountain et al. | 717/148 |
| 7,890,853 B2 * | 2/2011 | Neil et al. | 715/234 |
| 2003/0097457 A1 * | 5/2003 | Saran et al. | 709/230 |
| 2004/0158813 A1 * | 8/2004 | Xia et al. | 717/116 |
| 2006/0129972 A1 * | 6/2006 | Tyburski et al. | 717/106 |
| 2007/0022409 A1 * | 1/2007 | Levenshteyn | 717/136 |
| 2009/0037287 A1 * | 2/2009 | Baitalmal et al. | 705/26 |
| 2009/0172657 A1 * | 7/2009 | Makelainen et al. | 717/174 |
| 2009/0228862 A1 * | 9/2009 | Bertelrud et al. | 717/100 |
| 2009/0228868 A1 * | 9/2009 | Drukman et al. | 717/121 |
| 2009/0249296 A1 * | 10/2009 | Haenel et al. | 717/120 |
| 2009/0300578 A1 * | 12/2009 | Neil | 717/104 |
| 2009/0313004 A1 * | 12/2009 | Levi et al. | 703/28 |
| 2009/0327328 A1 * | 12/2009 | Woodall et al. | 707/102 |
| 2010/0146492 A1 * | 6/2010 | Shacham et al. | 717/137 |
| 2010/0306759 A1 * | 12/2010 | Kohler et al. | 717/174 |
| 2011/0066999 A1 * | 3/2011 | Rabinovich et al. | 717/104 |
| 2011/0078678 A1 * | 3/2011 | Matthews | 717/178 |
| 2012/0167047 A1 * | 6/2012 | Wyler et al. | 717/122 |

OTHER PUBLICATIONS

International Search Report and Written Opinion mailed Aug. 25, 2011.

* cited by examiner

*Primary Examiner* — Isaac Tecklu
(74) *Attorney, Agent, or Firm* — Winthrop & Weinstine, P.A.

(57) ABSTRACT

One set of instructions is generated in part by compiling application-specific source code. When natively executed on a platform provided by a device, the set of instructions provides an application. Another set of instructions is generated in part by compiling the same business logic source code. When natively executed on another platform provided by another device, the other set of instructions provides the same application. The business logic source code is substantially free of code specific to any platform. Moreover, the business logic source code defines substantially all application-specific functionality of the application.

16 Claims, 17 Drawing Sheets

US 8,601,449 B2

CROSS-PLATFORM APPLICATION FRAMEWORK

RELATED APPLICATION

This application claims the benefit of U.S. Patent Application Ser. No. 61/324,672, filed Apr. 15, 2011, the entire content of which is hereby incorporated by reference.

BACKGROUND

Increasingly sophisticated mobile computing devices have become pervasive in today's society. Such mobile computing devices no longer just have the ability to make phone calls or exchange text messages, but are now able to execute full-fledged software applications. Software applications for mobile computing devices can serve a wide variety of purposes. For example, some software applications for mobile computing devices are simple video games. In another example, some software applications for mobile computing devices support sales or inventory processes for enterprises.

Different types of mobile computing devices have different operating systems and capabilities. For example, some mobile phones use the ANDROID® operating system and other mobile phones use the IPHONE® operating system. In another example, some mobile computing devices support rich, full color graphical user interfaces while other mobile computing devices only provide simple text-based interfaces.

Because different types of mobile computing devices have different operating systems and capabilities, if a developer wants to develop a software application for different types of mobile computing devices, it has been necessary to develop separate versions of the software application for each of the different types of mobile computing devices. For example, a developer may have to develop a version of a software application for IPHONE® mobile phones and another version of the software application for BLACKBERRY® mobile phones. Development of different versions of a software application for different types of mobile computing devices can be a costly and time consuming process.

SUMMARY

One set of computer-readable instructions is generated in part by compiling business logic source code. When natively executed on a platform provided by a device, the set of computer-readable instructions provides an application. Another set of computer-readable instructions is generated in part by compiling the same business logic source code. When natively executed on another platform provided by another device, the other set of computer-readable instructions provides the same application. The business logic source code does not contain code specific to any platform. Moreover, the business logic source code defines all application-specific functionality of the application.

DETAILED DESCRIPTION

Figure 1:
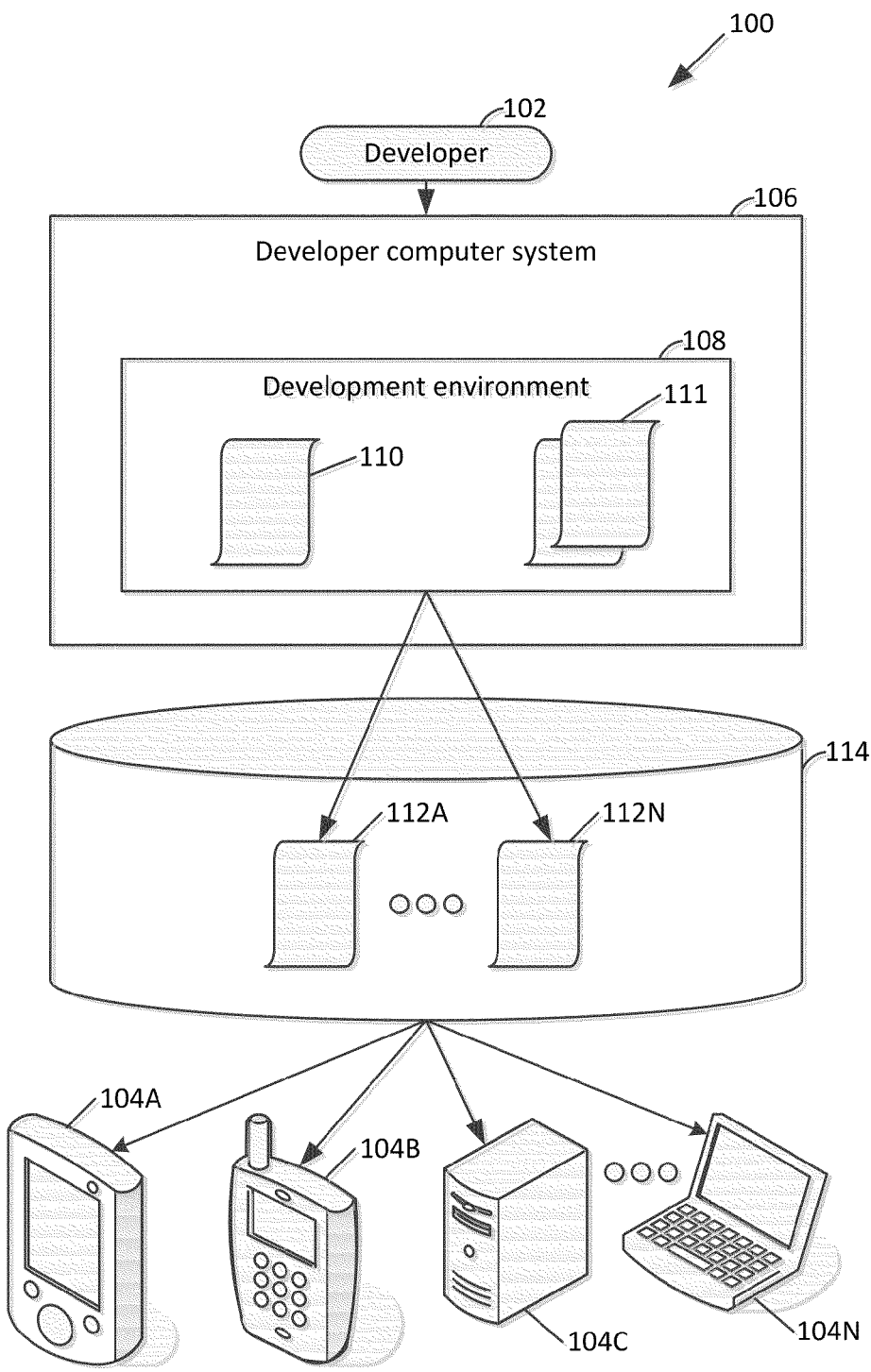
FIG. 1 is a block diagram illustrating an example system for developing and distributing an application.

FIG. 1 is a block diagram illustrating an example system 100 for developing and distributing an application. In the example of FIG. 1, a developer 102 develops an application. An application is a program for a providing specific functionality to users. The developer 102 can develop applications that provide various functionalities. For example, the developer 102 can develop an application to display lists of best-selling books. In another example, the developer 102 can develop an application that helps a user order machine parts.

The system 100 includes a set of computing devices 104A-104N (collectively, "computing devices 104"). In the Figures, ellipses between elements indicate that one or more similar elements are omitted from the Figures for clarity. Reference numerals that include letters A-N are not intended to indicate a minimum or maximum number of elements.

A computing device is a device that processes data. Example types of computing devices include mobile devices such as telephones, smart phones, feature phones, tablet computers, netbook computers, notebook computers, handheld game devices, personal media players, and in-vehicle computers. Mobile devices are generally computing devices that are designed to be carried by hand. Different mobile devices provide different types of platforms. Example types of computing devices also include desktop computers, household or commercial appliances, television set top boxes, digital video recorder devices, televisions, game consoles, gaming machines, point of sale computers, electronic inventory management devices, industrial computing devices, server computers, and other types of devices that process data. In the example of FIG. 1, the set of computing devices 104 includes a smart phone, a feature phone, a desktop computer, and a laptop computer. Other embodiments can include other types of computing devices.

Different ones of the computing devices 104 provide different platforms. A platform is a framework on which applications can be run. Example types of platforms include the WINDOWS PHONE 7® operating system from Microsoft Corp., the IOS® operating system from Apple Inc., the ANDROID® operating system from Google Inc., the WINDOWS 7® operating system from Microsoft Corp., the Telnet framework, and other types of frameworks on which applications can be run.

The developer 102 uses a developer computing system 106 to develop the application such that versions of the application are able to run on the platforms provided by the computing devices 104. The term computing system encompasses systems that comprise one or more computing devices. The developer computing system 106 provides a development environment 108 to assist the developer 102 in developing the application. To assist the developer 102 in developing the application, the development environment 108 provides tools that help the developer 102 prepare source code for the application. For example, the development environment 108 can provide text editing tools and testing tools that help the developer 102 prepare the source code for the application.

In addition, the development environment 108 generates multiple packages 112A through 112N (collectively, "packages 112"). The packages 112 can correspond to the same application, each package compiled to be executed or otherwise associated with a different platform. The packages 112 contain different sets of computer-readable instructions. The instructions in different ones of the packages 112 can be executed natively on the platforms associated with the packages 112. For example, the package 112A can contain instructions that a first platform can execute natively and the package 112N can contain instructions that a second platform can execute natively. Execution of the instructions in the packages 112 causes the application to be provided to a user. In some embodiments, the set of packages 112 can also include different applications for execution or association with the same platform or other platforms.

The development environment 108 generates the packages 112 by compiling sets of source code. Each set of source code includes the business logic source code 110 and a different set of platform-specific source code 111. In other words, the developer 102 uses the business logic source code 110 and the sets of platform-specific source code 111 to generate the packages 112. The development environment 108 generates different sets of computer-executable instructions for different platforms by compiling the business logic source code 110 with different ones of the sets of platform-specific source code 111.

The business logic source code 110 defines substantially all functionality of the application that is specific to the application. For example, the business logic source code 110 can define functionality that generates or retrieves data to be displayed by the application. In some embodiments, the business logic source code 110 defines all functionality that is specific to the application. In other embodiments, small amounts of code outside the business logic source code 110 define, influence, or affect functionality that is specific to the application. For example, in such embodiments less than one hundred lines of code outside the business logic source code 110 define functionality that is specific to the application.

The business logic source code 110 is substantially free of code that is specific to any platform. In some embodiments, the business logic source code 110 can include no code or no functioning code that is specific to any platform. For example, in some embodiments, the business logic source code 110 does not include code that is specific to an API of the ANDROID® platform, the WINDOWS PHONE 7® platform, or any other platform. In another example, the business logic source code 110 does not include code that is conditionally executed depending on which platform is running the application. In yet another example, the business logic source code 110 might not include code that causes the application to present different content or have a different navigational structure depending on the platform on which the application is running. In other embodiments, the business logic source code 110 can include a small amount of code that is specific to a platform. For example, in some embodiments, the business logic source code 110 includes less than twenty lines of code that are specific to a particular platform.

The sets of platform-specific source code 111 contain code that help the application operate on specific platforms. The sets of platform-specific code 111 are associated with different platforms. The sets of platform-specific code 111 are substantially free of code that defines functionality specific to applications. In some embodiments, the sets of platform-specific code 111 do not include any code that defines functionality specific to particular applications. For example, in some embodiments, the sets of platform-specific code 111 might not include code that defines content in user interfaces of specific applications, code that defines how a user navigates through applications, or blocks of code executed only for specifically-identified applications. In some embodiments, the sets of platform-specific code 111 include small amounts of code that defines, influences, or affects functionality specific to a particular application. For example, in some embodiments, each of the sets of platform-specific code 111 includes less than twenty lines of code that define functionality specific to a particular application.

Because the sets of platform-specific code 111 are substantially free of code that defines functionality specific to applications, the developer 102 and/or other developers can re-use the sets of platform-specific code 111 in many applications without making any, or at least substantial, changes to the sets of platform-specific code 111. For example, the developer 102 can develop business logic source code for an additional application. In this example, the developer 102 can then use the business logic source code for the additional application along with previously-used sets of platform-specific source code to generate sets of computer-executable instructions suitable for execution on different platforms.

In some embodiments, the developer 102 may need to modify fewer than twenty lines of code to adapt the platform-specific code 111 for use with the application. Furthermore, in some embodiments, the developer 102 may only need to comment-out code, remove commenting on code, or modify values of parameters in order to adapt the platform-specific code 111 for use with the application.

In various embodiments, the developer 102 can obtain the sets of platform-specific code 111 in various ways. For example, the developer 102 can obtain the sets of platform-specific code 111 from one or more outside parties. In this example, the one or more outside parties can include vendors, retailers, consultants, other developers, or other entities separate from the developer 102 or an organization to which the developer 102 belongs. Furthermore, in this example, the developer 102 can obtain the sets of platform-specific code 111 from the one or more outside parties in exchange for items or services of value, such as monetary payments. Moreover, in this example, the developer computing system 106 can download or otherwise copy the sets of platform-specific code 111 from a data storage system provided by the one or more outside parties. In another example, the developer 102 can write the sets of platform-specific code 111. In some embodiments, the sets of platform-specific code 111 can be available on a software-as-a-service (SaaS) basis.

In some embodiments, the packages 112 include computer-executable instructions compiled from the sets of platform-specific code 111. For example, if the package 112A is associated with a given platform, the package 112A can include computer-executable instructions compiled from one of the sets of platform-specific code 111 that is associated with the given platform.

After the development environment 108 generates the packages 112, the packages 112 are stored in a data storage system 114. Various embodiments implement the data storage system 114 in various ways. For example, some embodiments implement the data storage system 114 as a file system. In another example, the data storage system 114 can be implemented as a relational database.

The computing devices 104 obtain the packages 112 from the data storage system 114. In various embodiments, the computing devices 104 obtain the packages 112 from the data storage system 114 in various ways. For example, the computing devices 104 can obtain appropriate ones of the packages 112 by sending requests to a server (not shown) that retrieves the packages 112 from the data storage system 114 and sends the packages 112 to the computing devices 104. In another example, a computing device can perform a distribution process that pushes the packages 112 out from the data storage system 114 to one or more of the computing devices 104.

Figure 2:
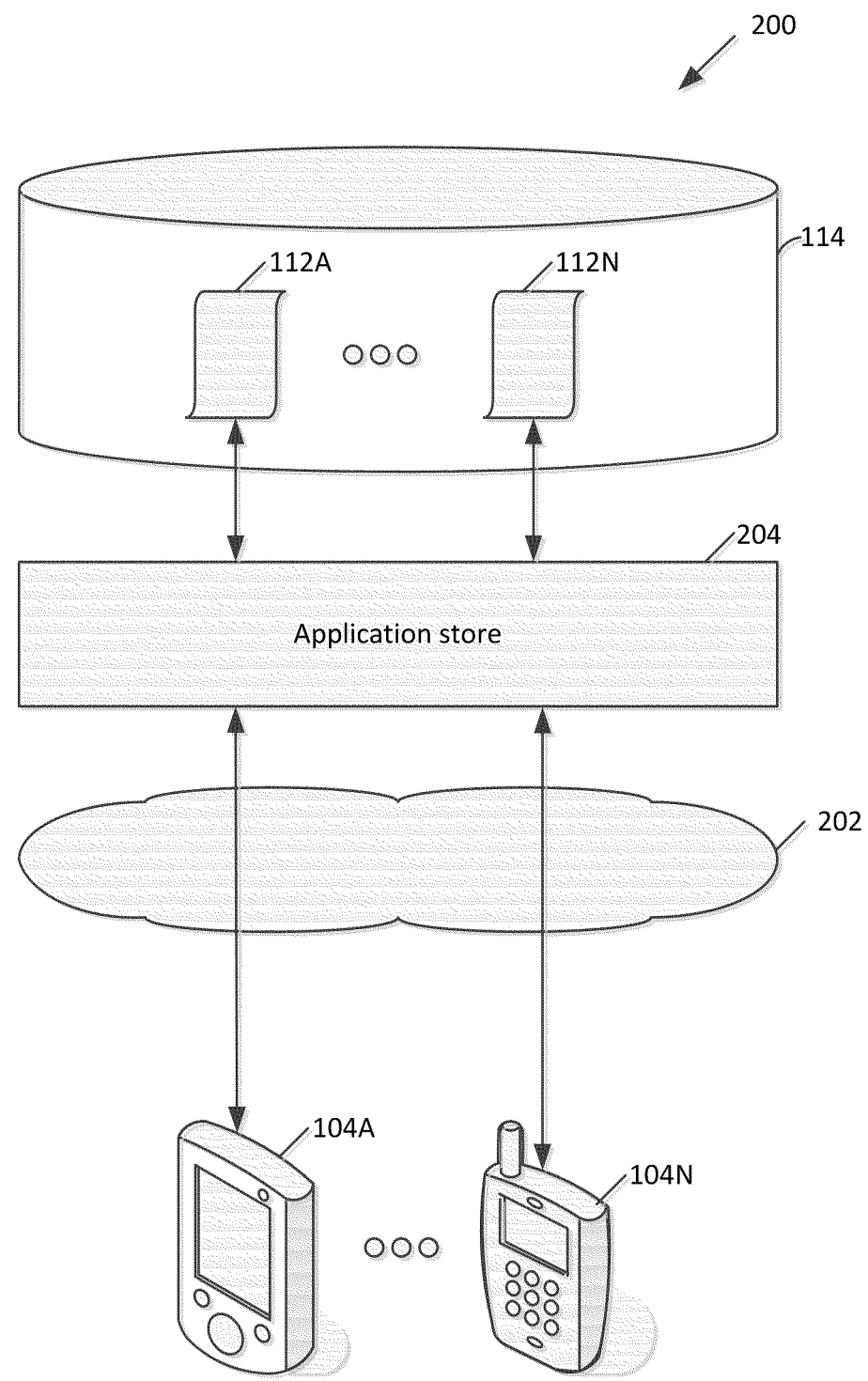
FIG. 2 is a block diagram illustrating an example alternate embodiment of a system for distributing an application.

Applications developed using the developer computing system 106 or as otherwise disclosed herein can be distributed using several different systems. For example, FIG. 2 illustrates a block diagram of an example alternate embodiment of a system for distributing applications among the many possible systems for distributing applications. In the example of FIG. 2, an application distribution system 200 includes the data storage system 114 and the computing devices 104 as described above with regard to the example of FIG. 1. To obtain the packages 112, the computing devices 104 communicate over a network 202 with an application store 204. The network 202 can comprise various types of networks. For example, the network 202 can comprise the Internet, a local area network, a campus area network, or another type of network.

The application store 204 is an electronic marketplace for software applications. For example, the application store 204 can be Apple Inc.'s APP STORE®, Google, Inc.'s Android Market, Microsoft Corp.'s Windows Phone Marketplace, Research In Motion Ltd.'s APP WORLD®, Amazon.com, or another electronic marketplace for software applications. In some embodiments, an owner or operator of the application store 204 may own or operate the data storage system 114. In other embodiments, the application store 204 and the data storage system 114 are owned and/or operated by different entities.

Users of the computing devices 104 can use the computing devices 104 to purchase the application through the application store 204. When a user of one of the computing devices 104 purchases the application, the application store 204 retrieves one of the packages 112 and transmits the package to the computing device. In some instances, the users of the computing devices 104 can purchase ones of the packages 112 associated with different platforms from different application stores.

Figure 3:
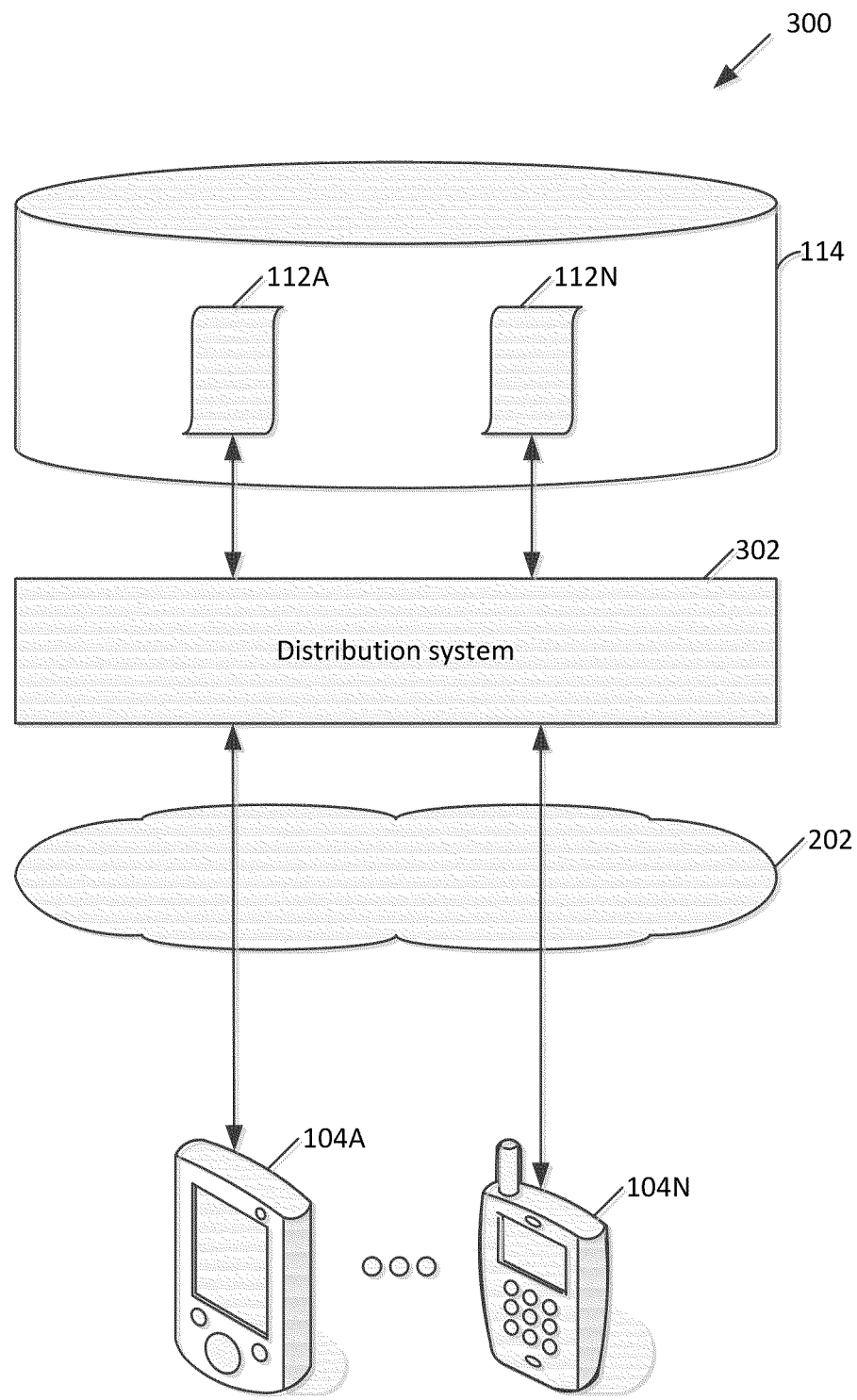
FIG. 3 is a block diagram illustrating another example alternate embodiment of a system for distributing an application.

FIG. 3 is a block diagram illustrating another example alternate embodiment of a system for distributing the application. In the example of FIG. 3, an application distribution system 300 includes the data storage system 114. The data storage system 114 stores the packages 112. To obtain the packages 112, the computing devices 104 communicate over the network 202 with a distribution system 302.

The distribution system 302 performs a process that automatically distributes the packages 112 to the computing devices 104. In other words, the distribution system 302 pushes the packages 112 out to the computing devices 104. For example, the computing devices 104 can be associated with an organization, the package 112A can be associated with a first platform, and the package 112N can be associated with a second, different platform. In this example, the distribution system 302 can communicate with the computing devices 104 to determine which ones of the computing devices 104 provide the first platform and which ones of the computing devices 104 provide the second platform. In this example, the distribution 302 pushes the package 112A out to the computing devices 104 that provide the first platform and pushes the package 112N out to the computing devices 104 that provide the second platform. Performing such an automated distribution process can be useful in an organization setting in order to ensure that the correct software is installed on the enterprise's computing devices.

Figure 4:
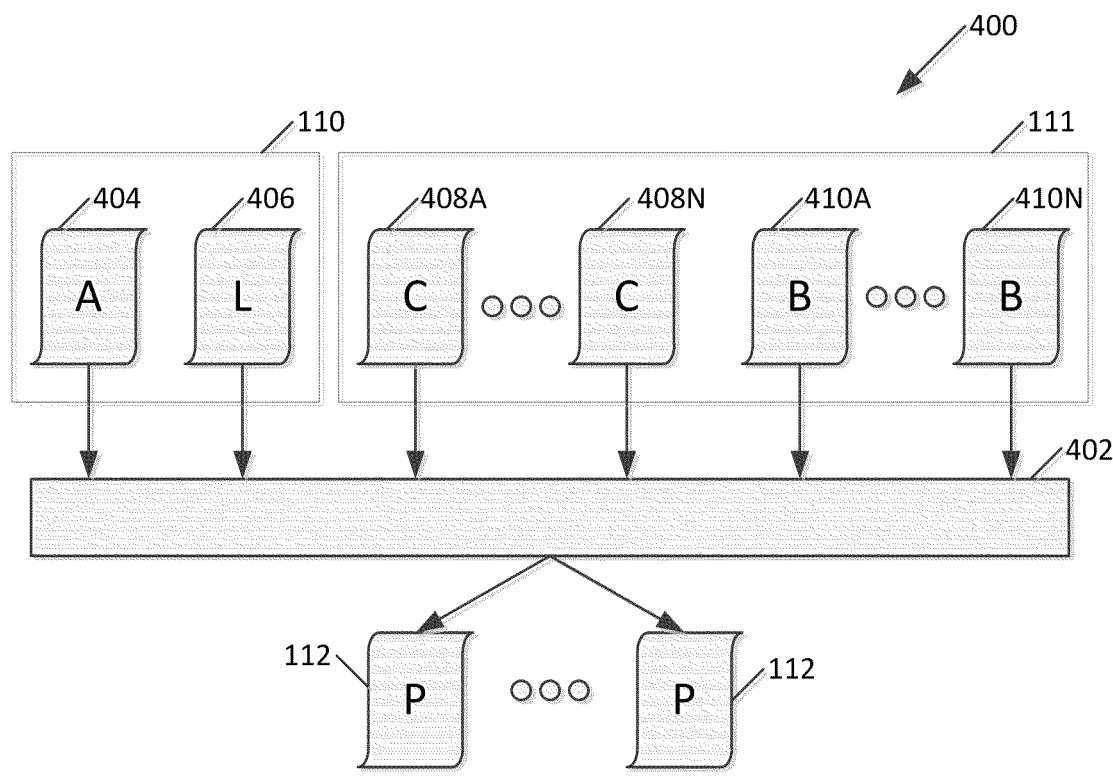
FIG. 4 is a block diagram illustrating an example system for generating computer-readable instructions of an application.

FIG. 4 is a block diagram illustrating an example system 400 for generating computer-readable instructions of an application. As illustrated in the example of FIG. 4, a compiler application 402 generates the packages 112. In different embodiments, the packages 112 may or may not be in an archive format. In some embodiments, the compiler application 402 is part of the development environment 108. In other embodiments, the compiler application 402 is separate from the development environment 108.

The compiler application 402 generates the packages 112 by compiling the business logic source code 110 and one or more of the sets of platform-specific source code 111. As mentioned above, the business logic source code 110 defines the functionality of the application that is specific to the application. The business logic source code 110 does not include code that is specific to any given platform. The sets of platform-specific source code 111 contain code that help the application operate on specific platforms. The sets of platform-specific source code 111 are specific to particular platforms.

As illustrated in the example of FIG. 4, the business logic source code 110 comprises application source code 404 and layer source code 406. The application source code 404 and the layer source code 406 define application-specific functionality and are substantially free of code specific to any given platform. The application source code 404 defines an application initialization operation and a navigation operation. The layer source code 406 defines one or more layer classes.

The sets of platform-specific source code 111 include container source code sets 408A-408N (collectively, "container source code sets 408") and binding source code sets 410A-410N (collectively, binding source code sets 410"). The container source code sets 408 define platform-specific initialization operations that initialize the application. The binding source code sets 410 define layer output operations that generate output data that can be used by different platforms to present layers using user interface features that are native to different platforms. Each of the container source code sets 408 contains code specific to a different platform. Each of the binding source code sets 410 contains code specific to a different platform. The binding source code sets 410 are substantially free of code that defines functionality specific to any particular application.

In various embodiments, the layer source code 406, the application source code 404, the container source code sets 408, and the binding source code sets 410 are written in various high level programming languages. For example, in some embodiments, the layer source code 406, the application source code 404, the container source code sets 408, and/or the binding source code sets 410 are written in the C# programming language, the Objective C programming language, the C programming language, the C++ programming language, the Java programming language, or another type of high-level programming language. Because the layer source code 406, the application source code 404, the container source code sets 408, and the binding source code sets 410 are written in a high-level programming language, syntax errors in the source code can be detected at compile time instead of at execution time. Because syntax errors are detected at compile time instead of at execution time, computing devices that run the packages 112 may be more reliable because such computing devices are less likely to crash or hang due to such syntax errors. Furthermore, because the packages 112 comprise compiled high-level programming language code, the application can be executed more efficiently than if the packages contained interpreted programming language code. Thus, by executing compiled code instead of interpreted code, computing devices that run the packages 112 can operate faster and more reliably.

In some instances, multiple different platforms can be associated with the same container source code set 408 and/or the same binding source code set 410. For example, IPHONEs® and IPADs® can both be associated with the same container source code set 408 and/or the same binding source code set 410. In some instances, a single platform can be associated with multiple container source code sets 408 or multiple binding source code sets 410. Each of the container source code sets 408 and/or binding source code sets 410 can be stored in a different file.

Figure 5:
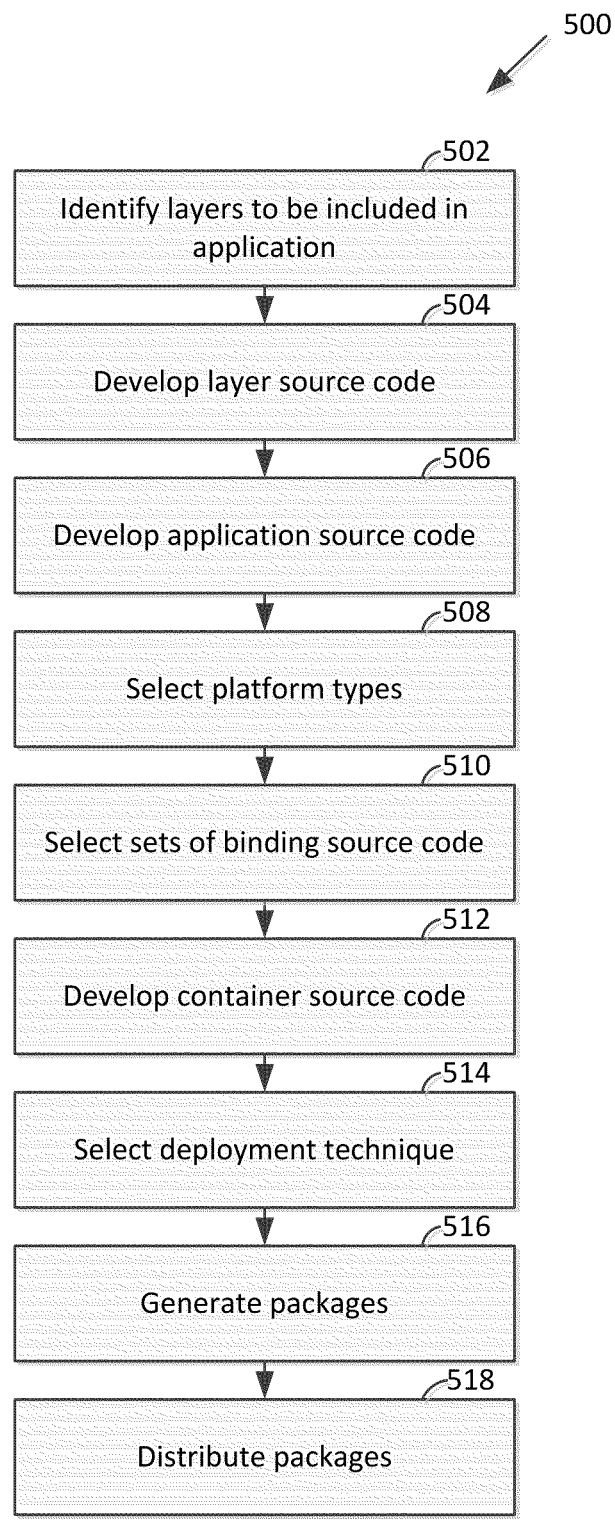
FIG. 5 is a flowchart illustrating an example application development process.

FIG. 5 is a flowchart illustrating an example application development process 500. The developer 102 performs the application development process 500 to develop an application that can operate on multiple platforms. In other words, the developer 102 uses the application development process 500 to develop a cross-platform application.

To build an application, the developer 102 identifies layers to be included in the application (502). A layer comprises a set of content presented as a unit by an application to a user of the application. Layers can contain a wide variety of content. For example, a layer of the application can contain a synopsis of a book, a listing of television schedules, sports scores, a video clip, a main menu of the application, and other sets of content presented as a unit by the application to the user of the application.

Because the content in a layer is presented as a unit, it is not necessary to perform a navigation operation to see additional content in the layer. A navigation operation is an operation to change the layer currently presented by an application to a user. For example, in some platforms, a user might need to scroll up or down to see additional content in a layer, but would not need to navigate away from the layer to see the additional content.

Different platforms can present the same layer in different ways. For example, a Telnet platform can present a list of book titles in a layer as a series of plain text strings representing the book titles. In this example, an Interactive Voice Response (IVR) platform can present the same list of book titles by outputting the spoken sounds of the book titles. Furthermore, in this example, an IPHONE® platform can present the same list of book titles as a list of richly-formatted text strings representing the book titles.

Each of the layers in the application is associated with a different layer Uniform Resource Identifier (URI). For example, a first layer in the application contains a text area that contains a synopsis of a book and a second layer in the application contains a text area that contains a synopsis of another book. In this example, the first layer can be associated with the layer URI "http://www.example.com/application1/layer1?bookID=32" and the second layer can be associated with the layer URI "http://www.example.com/application1/layer1?bookID=525".

A layer comprises one or more content elements. A content element comprises a structured set of content to be presented by an application to a user. Various content elements structure sets of content in different ways. Example types of content element include lists, list data items, menus, menu items, images, text blocks, text input areas, geographical maps, panels, and so on. Different platforms can present the same content elements in different ways. For example, an IPHONE® platform can present a menu as a list of selectable graphical elements associated with each menu item in the menu. In this example, a Telnet system can present the same menu as a list of text strings associated with each menu item in the menu. Each text string in the list is associated with a number. In this example, the Telnet system also displays a prompt that asks the user to enter the number of the desired menu item.

The content elements of a layer can include navigation elements. A navigation element is a content element that, when selected by a user, causes the application to navigate to another layer of the application. Each navigation element specifies the layer URI of the layer to which the application navigates when a user selects the navigation element. Like other types of content elements, different platforms can present navigation elements in different ways. For example, in some embodiments, a web browser platform presents a navigation element as a hyperlink. In this example, an IPHONE® platform can present the same navigation element as a graphical control.

In some possible embodiments, the layers of the application include a home layer. The home layer of the application is the layer of the application that, by default, a user of the application uses to begin working with the application. In various applications, the home layer contains various types of content. For example, in some applications, the home layer acts like a main menu of the application and comprises navigation elements that enable the user to navigate to various other layers of the application. In other applications, the home layer is a splash screen for the application.

After the developer 102 identifies the layers to be included in the application, the developer 102 develops the layer source code 406 (504). Alternatively, the developer 102 selects the layer source code 406 from a library of already existing layer source code. That is, the layer source code 406 can be reused in multiple applications.

The layer source code 406 defines one or more layer classes. In general, each of the layer classes is a descriptive tool that defines a set of attributes and/or services that characterize members (objects) of the class. Each of the layer classes corresponds to a different one of the identified layers. A layer module is a software object that is an instance of a layer class. A layer module represents a layer.

Each of the layer classes defined by the layer source code 406 contains a load operation. The load operation loads data into the layer module. The load operation can perform a wide variety of activities to load content into the appropriate layer module. For example, the load operation can populate a menu with menu items. In another example, the load operation can retrieve data from a network or a database and populate the data into a text block.

There is no need to develop or select different layer source code 406 for versions of the application that operate on different platforms. In other words, the layer source code 406 is not specific to any platform. Consequently, the load operations defined by the layer source code 406 load the same content into the layer modules regardless of the platform on which the application is operating.

To develop the application, the developer 102 also develops the application source code 404 (506). The application source code 404 defines an application initialization operation and a navigation operation. When executed, the application initialization operation initializes a navigation map. The navigation map maps layer URIs to layer modules. In some embodiments, the application source code 404 automatically generates the layer URIs. In other embodiments, the application source code 404 uses pre-defined layer URIs. When the application receives a navigation request, the navigation operation uses the navigation map to identify an appropriate layer module from a plurality of layer modules. The appropriate layer module is associated with a layer URI specified by the navigation request. The load operation of the appropriate layer module is then invoked to load content into the appropriate layer module. A navigation request is a request to navigate the application from one layer of the application to another layer of the application.

There is no need for the developer 102 to develop different application source code 404 for versions of the application that operate on different platforms. Rather, the same application source code 404 is used in versions of the application that operate on different platforms. In other words, the application source code 404 is not specific to any platform. Consequently, the navigation operation specified by the application source code 404 uses the same load operations of the layer source code, regardless of the platform on which the application is operating.

The business logic source code 110 of the application comprises the application source code 404 and the layer source code 406 of the application. The business logic source code 110 does not contain code that is specific to any platform. Moreover, the business logic source code 110 defines all functionality of the application that is specific to the application. In other words, the functionality of the application, as perceived by a user of the application, is defined in the business logic source code 110 in a way that is not specific to any platform.

Furthermore, to develop the application, the developer 102 selects one or more platforms on which the application is to operate (508). For example, the developer 102 can select a platform associated with the IPHONE® and the IPAD®. In another example, the developer 102 can select a platform associated with Telnet clients. Different platforms provide different application programming interfaces (APIs) that present information to a user and receive input from the user.

After selecting the platforms on which the application is to operate, the developer 102 selects the binding source code sets 410 associated with the selected platforms (510). In some embodiments, the developer 102 obtains a library of pre-defined sets of binding source code. In such embodiments, the developer 102 can obtain the library from various sources. In various embodiments, for example, the developer 102 can download individual bindings, download sets of bindings, develop his or her own bindings and associated library, or access the bindings from a library provided as SaaS. In use, the developer 102 can select the binding source code sets 410 associated with the selected platforms from among the sets of binding source code stored in the library. For example, the developer 102 can acquire a copy of the library and/or rights to use the library from an outside party in exchange for items or services of value. The sets of binding source code in the library can be added to the library by the developer 102 or an outside party prior to development of the application. The sets of binding source code in the library can be re-used in substantially the same form in multiple applications. For example, in some embodiments, the sets of binding source code in the library can be re-used in exactly the same form in multiple applications. In other embodiments, the sets of binding source code in the library can be re-used in other applications after minor changes (e.g., less than twenty lines of code) to the sets of binding source code.

The binding source code sets 410 define layer output operations that generate output data that can be used by different platforms to present layers using user interface features that are native to different platforms. For example, the binding source code set 410A can define a layer output operation that processes layer modules to present layers using user interface features that are native to IPHONE® devices. In this example, the binding source code set 410B can define a layer output operation that processes the same layer modules to present layers using user interface features that are native to ANDROID® based mobile phones.

Next, the developer 102 develops container source code sets 408 (512). Each of the container source code sets 408 corresponds to a different one of the selected platforms. As described in detail elsewhere in this document, each of the container source code sets 408 defines an initialization operation that initializes the application.

In some embodiments, the developer 102 obtains the container source code sets 408 from a library of pre-existing sets of container source code. This library can be developed, maintained, and/or expanded by the developer 102, an outside party, or another entity in the same way the developer would access bindings from a library as discussed herein. In some instances, the developer 102 can receive a copy of the library and/or rights to use the library from an outside party in exchange for items or services of value. In such embodiments, the developer 102 develops the container source code sets 408 by modifying pre-existing sets of container source code in the library such that the container source code sets 408 identify an application class defined by the application source code 404 of the application. Thus, the container source code sets 408 are specific to the application and individual ones of the selected platforms. However, the container source code sets 408 do not define any functionality that differentiates the application from other applications. An example initialization operation is described herein with regard to FIG. 15.

Next, the developer 102 selects a deployment technique for the application (514). The deployment technique for the application governs where various modules in the application operate. The development, distribution, and execution of applications using various deployment techniques are described with regard to FIGS. 7 through 14.

After selecting the deployment technique, one or more computing systems generate packages 112 corresponding to the selected platforms (516). Each of the packages 112 comprises a set of computer-readable instructions compiled from the application source code 404 for the application, the layer source code 406 for the application, the container source code 508 for a specific platform, and the set of binding source code 510 for the specific platform. The instructions in each of the packages 112, when natively executed by devices that provide appropriate ones of the selected platforms, provide the same application.

Instructions execute natively on a platform when no intervening software between the instructions and the platform is needed to execute the instructions. For example, a special plug-in or virtual machines is not needed execute the instructions in the packages on appropriate ones of the selected platforms.

After the packages 112 are developed, the developer 102 distributes the packages 112 for installation and use on the computing devices 104 (518). In various embodiments, the packages 112 are distributed in various ways. For example, in some embodiments, an online application store, such as Apple Inc.'s APP STORE®, is used to distribute the packages 112. In other embodiments, the packages 112 are distributed directly to the computing devices 104.

Figure 6:
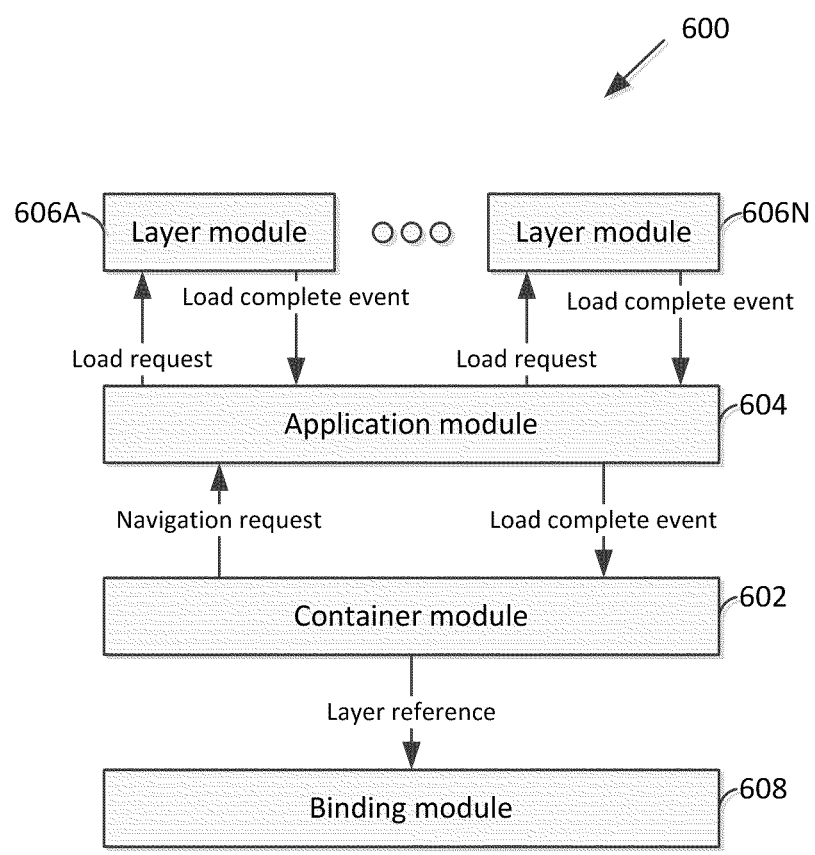
FIG. 6 is a block diagram illustrating an example software system.

FIG. 6 is a block diagram illustrating example modules in an application 600. As illustrated in the example of FIG. 6, the application 600 comprises a container module 602, an application module 604, layer modules 606A through 606N (collectively, "layer modules 606"), and a binding module 608. The application source code 404 of the application defines the functionality of the application module 604. Different layer classes in the layer source code 406 define the functionalities of different ones the layer modules 606. One of the container source code sets 408 defines the functionality of the container module 602. One of the binding source code sets 410 defines the functionality of the binding module 608.

When the application 600 is launched, the container module 602 begins executing. When the container module 602 begins executing, the container module 602 performs an initialization operation. The initialization operation initializes the application. An example initialization operation is described with regard to FIG. 15. As part of the initialization operation, the container module 602 provides an initial navigation request to the application module 604. The initial navigation request specifies a layer URI that indicates a home layer of the application.

In response to receiving a navigation request, the application module 604 performs a navigation operation. An example navigation operation is described herein with regard to FIG. 16. As part of the navigation operation, the application module 604 uses a navigation map to identify an appropriate layer module. The appropriate layer module is the one of the layer modules 606 associated with the layer URI specified by the navigation request. The application module 604 then provides a load request to the appropriate layer module. The load request is a request to perform a load operation of the appropriate layer module.

When the appropriate layer module receives the load request, the appropriate layer module performs a load operation. The load operation loads content into the appropriate layer module. Various embodiments implement the load operation in various ways. For example, in some embodiments, each layer module comprises one or more content elements. The load operation loads data into the layer module by loading data into one or more of the content elements of the layer module. For example, a layer module can contain a content element that represents a list. In the example, the load operation can load data into the layer module by retrieving the titles of best-selling books from a website and loading the titles into the list. Each of the layer modules 606 can include different content elements and can implement the load operation differently. Consequently, different content is loaded into different ones of the layer modules 606.

After the appropriate layer module performs the load operation, the appropriate layer module provides a load complete event to the application module 604. The load complete event contains a reference to the appropriate layer module.

After receiving the load complete event from the appropriate layer module, the application module 604 generates a load complete event. The load complete event generated by the application module 604 indicates that the appropriate layer module has completed loading content. In some deployment techniques, the load complete event contains a layer reference. The layer reference comprises a pointer to the appropriate layer module. In other deployment techniques, the load complete event contains a serialized version of the appropriate layer module.

The container module 602 listens for load complete events generated by the application module 604. When the container module 602 detects a load complete event generated by the application module 604, the container module 602 provides the layer reference or the serialized version of the appropriate layer module to the binding module 608.

When the binding module 608 receives the layer reference or the serialized version of the appropriate layer module, the binding module 608 performs a layer output operation on the appropriate layer module. The layer output operation generates output data that can be used by a platform to present the appropriate layer module as one or more user interface features that are native to the platform. As described below, different binding modules can generate various types of output data by performing the layer output operation on the appropriate layer module.

Various embodiments implement the layer output operation in various ways. For example, in some embodiments, each of the binding source code sets 410 defines content output operations. The content output operations correspond to different types of content elements. For example, the binding source code sets 410 can include content output operations for lists, content output operations for list data items, content output operations for menus, content output operations for menu item, content output operations for images, and so on.

The content output operations in the binding source code sets 410 for different platforms generate output data that is usable by the different platforms to present content elements. For example, the binding source code set 410A can define a content output operation that generates output data that an IPHONE® platform can use to present lists. In this example, the binding source code set 410B can define a content output operation that generates output data that an ANDROID® platform can use to present lists.

When performing the layer output operation on the appropriate layer module, the binding module 608 utilizes the output operations for each of the content elements in the appropriate layer module. For example, if the content elements of the appropriate layer module include a list and an image, the binding module 608 performs the output operation for the list and the output operation for the image when performing the layer output operation on the appropriate layer module. In this way, the layer output operation generates output data usable to present each content element of the appropriate layer module as one or more user interface features native to a particular platform.

When a user selects a navigation element in a layer in the application, the application module 604 receives a navigation request. The navigation request specifies the layer URI of another layer of the application. When the application module 604 receives the navigation request, the process described above recurs with regard to the other layer.

Figure 7:
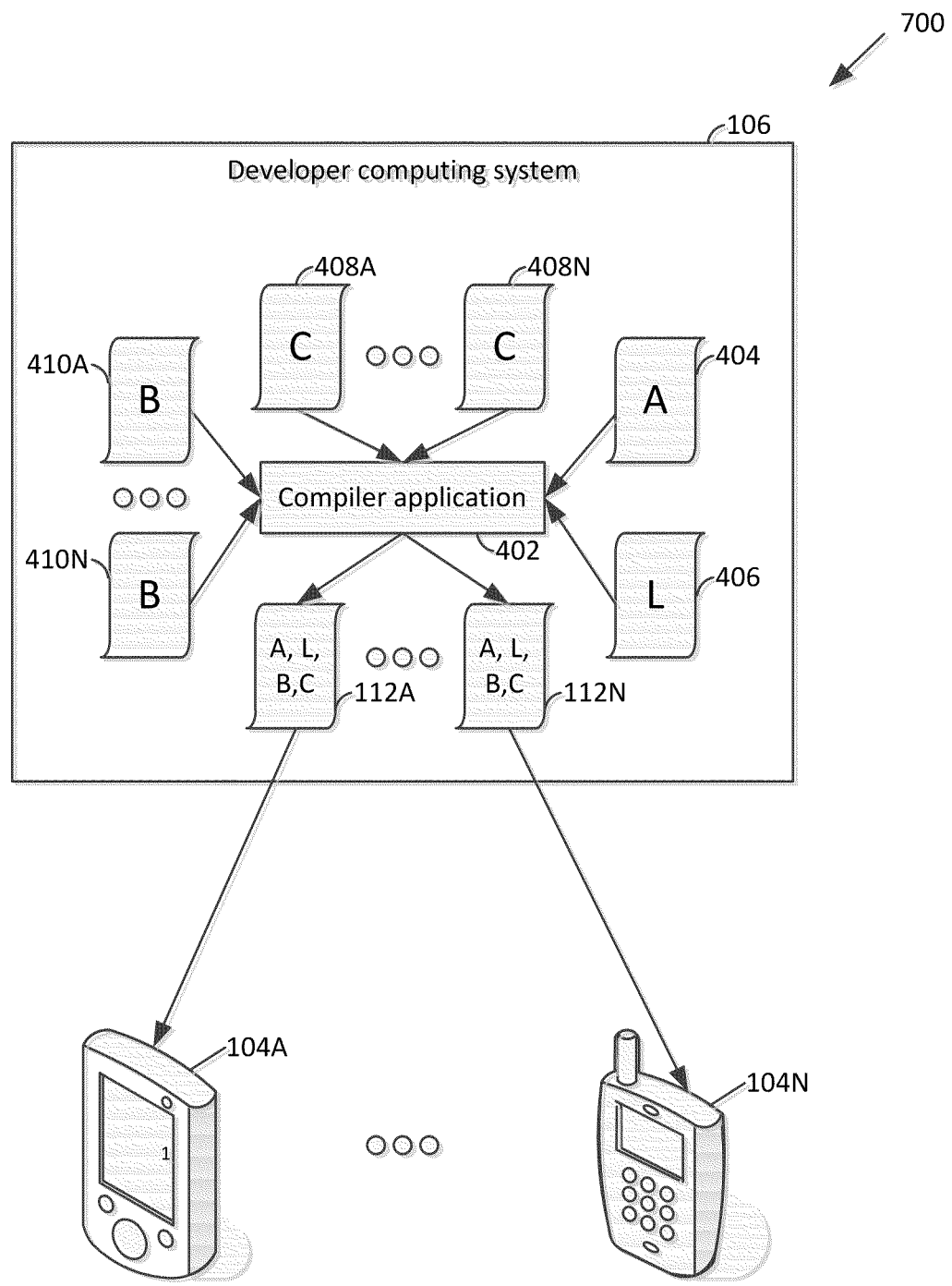
FIG. 7 is a block diagram illustrating an example system for developing and distributing an application using a client-based deployment technique.

FIG. 7 is a block diagram illustrating an example system 700 for developing and distributing applications using a client-based deployment technique. When an application is deployed using the client-based deployment technique, the container module 602, the application module 604, the layer modules 606, and the binding module 608 operate on a client computing device.

As illustrated in the example of FIG. 7, the system 700 comprises the developer computing system 106. The developer computing system 106 includes the compiler application 402. In the client-based deployment technique, the compiler application 402 generates the packages 112 such that each of the packages 112 includes compiled instructions defining the application module 604, the layer modules 606, a container module, and a binding module. The packages 112 are suitable for installation on computing devices that provide different platforms.

When the application is deployed using the client-based deployment technique, the packages 112 are distributed to the computing devices 104. For ease of explanation, the example of FIG. 7 only illustrates a touch screen-style smart phone and a feature phone. However, in other embodiments, the computing devices 104 can be a wide variety of different types of mobile devices, such as inventory management devices, mobile phones, tablet computers, netbook computers and so on. Furthermore, although only mobile devices are shown, it should be appreciated that the same capabilities and functionality described in this document with regard to the computing devices 104 can, in some embodiments, be performed by mobile devices, such as smart phones or tablet computers, or non-mobile devices, such as desktop computers, server computers, and so on.

After the packages 112 are distributed to the computing devices 104, the computing devices 104 install the packages 112. After installation, the computing devices 104 execute the instructions in the packages 112.

Figure 8:
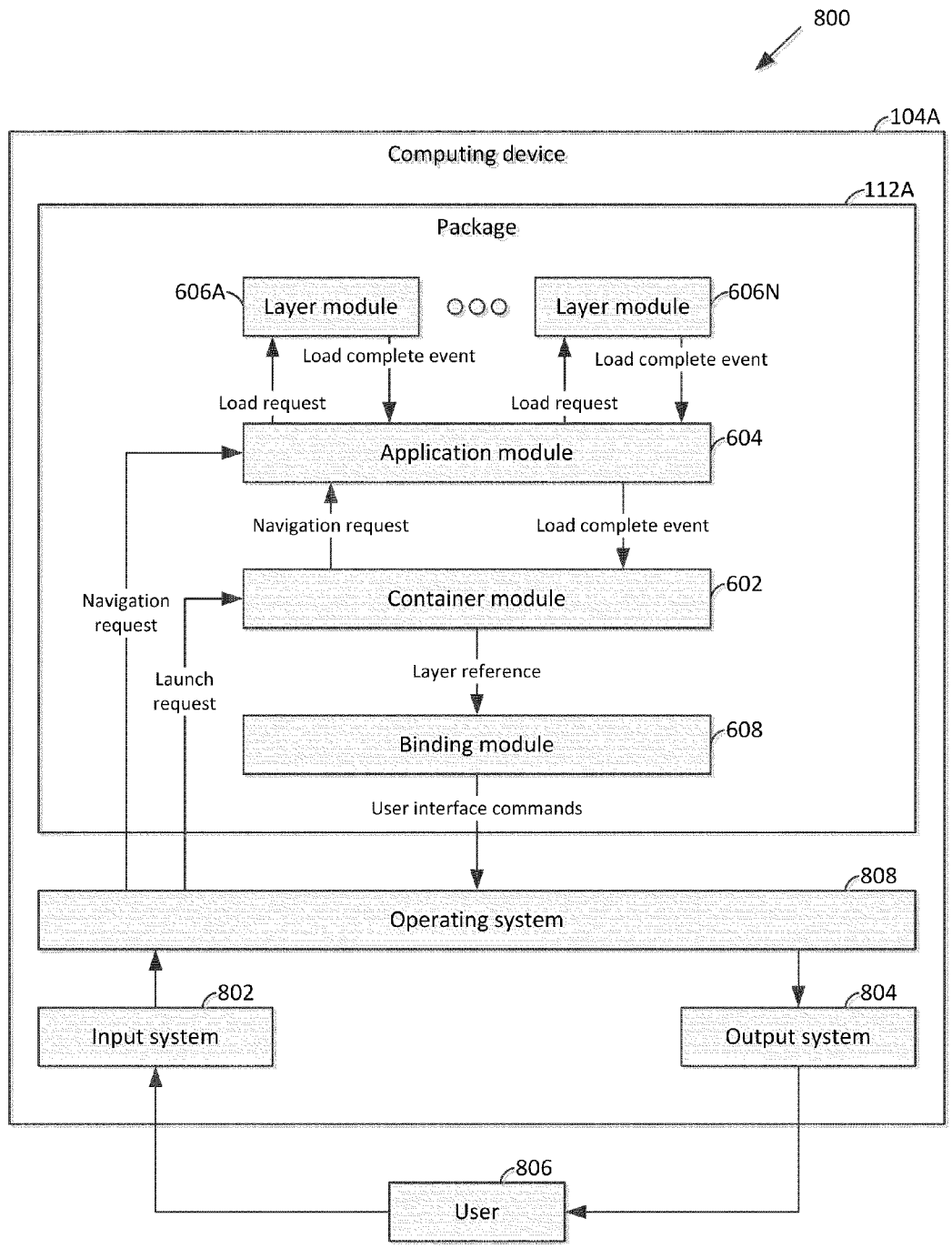
FIG. 8 is a block diagram illustrating an example system for executing an application that uses the client-based deployment technique.

FIG. 8 is a block diagram illustrating an example system 800 for executing applications that use the client-based deployment technique. As illustrated in the example of FIG. 8, the system 800 comprises the computing device 104A. Although the example of FIG. 8 is described with regard to the computing device 104A, it should be appreciated that other ones of the computing devices 104 can employ similar systems for executing applications that use the client-based deployment technique.

The computing device 104A comprises an input system 802 and an output system 804. The input system 802 enables the computing device 104A to receive input from a user 806 of the computing device 104A. In various embodiments, the input system 802 can be a variety of different types of systems that enable the computing device 104A to receive input from the user 806. For example, the input system 802 can be a touch screen, a keyboard, a keypad, a pointing device (e.g., a mouse, touchpad, trackball, etc.), a button array, a microphone, or another type of system that enables the computing device 104A to receive input from the user 806. The output system 804 enables the computing device 104A to provide output to the user 806. In various embodiments, the output system 804 can be a variety of different types of systems that provide output to users. For example, the output system 804 can be a graphics screen (e.g., a monitor, an LCD screen, an LED screen, etc.), a speaker system, or another type of system that is capable of providing output to users. Furthermore, in some embodiments, the input system 802 and the output system 804 are physically the same system. For instance, the input system 802 and the output system 804 can be a single touch screen.

In addition, the computing device 104A provides an operating system 808. The operating system 808 is a software system that manages the hardware resources of the computing device 104A and supports the operation of software applications. In various embodiments, the operating system 808 can be a variety of different types of operating systems. For example, the operating system 808 can be a WINDOWS PHONE 7® operating system, a WINDOWS 7® operating system, an IPHONE® operating system, an OS X® operating system, a WEBOS® operating system from Hewlett Packard Company, a Linux operating system, an ANDROID® operating system, a CHROME® operating system from Google, Inc., or another type of operating system.

As illustrated in the example of FIG. 8, the computing device 104A comprises the package 112A. Execution of instructions in the package 112A by a processing unit of the computing device 104A causes the computing device 104A to provide the container module 602, the application module 604, the layer modules 606, and the binding module 608.

To use the application, the user 806 uses the input system 802 to provide a launch command to the operating system 808. In response, the operating system 808 provides a launch request to the container module 602. After the container module 602 receives the launch request, the container module 602, the application module 604, the layer modules 606 and the binding module 608 behave in the manner described above with regard to the example of FIG. 6.

In the client-based deployment, the binding module 608 outputs user interface commands when the binding module 608 processes a layer module. The user interface commands cause the output system 804 to present the layer represented by the layer module. For example, the user interface commands can cause the output system 804 to display the layer or can cause the output system 804 to output audio signals representing the layer.

Figure 9:
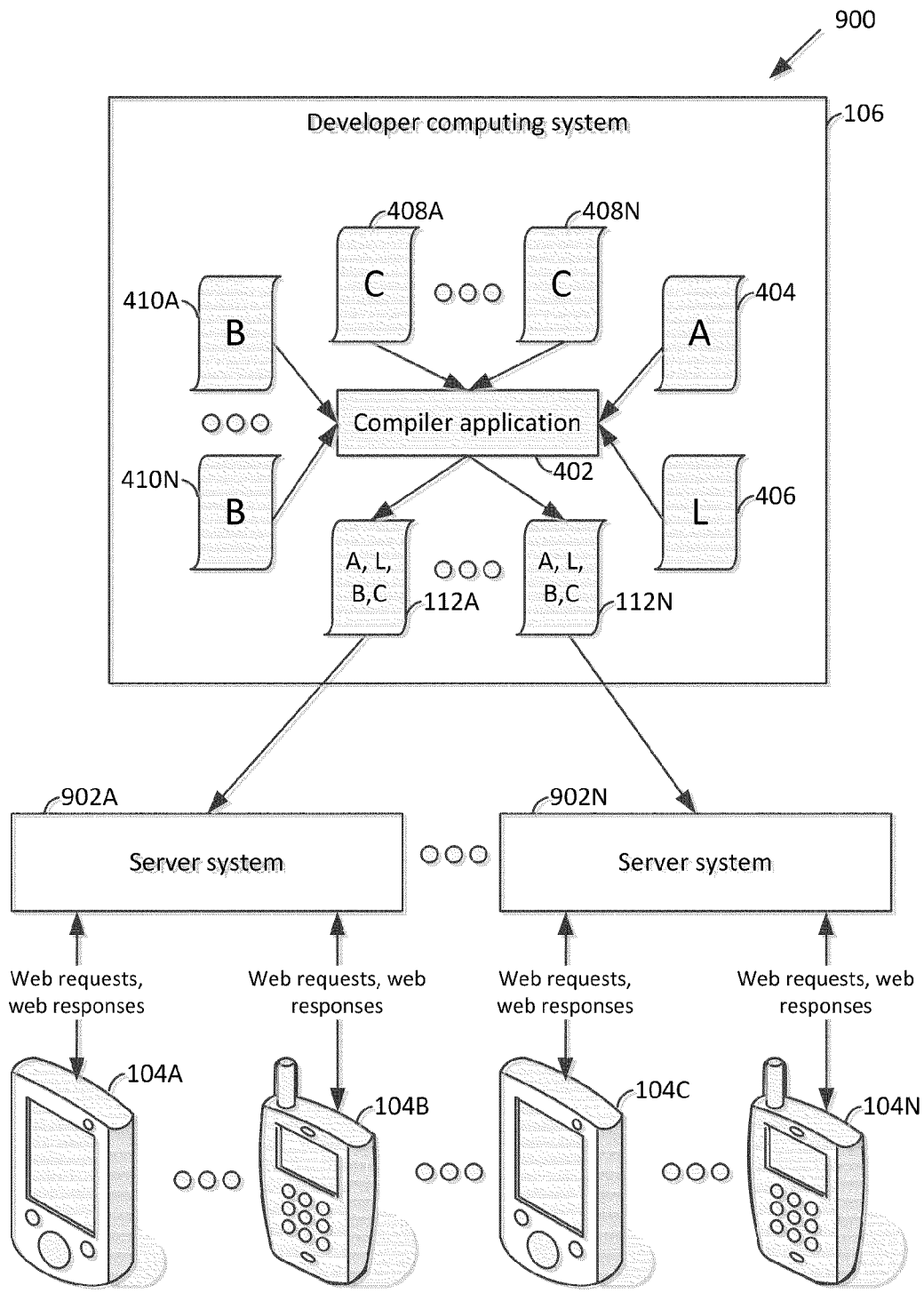
FIG. 9 is a block diagram illustrating an example system for developing and distributing an application using a server-based deployment technique.

FIG. 9 is a block diagram illustrating an example system 900 for developing and distributing applications that use a server-based deployment technique. When an application is deployed using the server-based deployment technique, the container module 602, the application module 604, the layer modules 606, and the binding module 608 operate on the server systems 902. The server-based deployment technique can be useful in situations where it is not desirable or possible to install additional applications on the computing devices 104.

As illustrated in the example of FIG. 9, the system 900 comprises the developer computing system 106. The system 900 also comprises the computing devices 104. For ease of explanation, only a touch screen-style smart phone and a feature phone are illustrated in the example of FIG. 9. However, in other embodiments, the computing devices 104 can be replaced by a wide variety of different types of computing devices, such as desktop computers, mobile phones, tablet computers, and so on.

The system 900 also comprises server systems 902A through 902N (collectively, "server systems 902"). The server systems 902 are computer systems. The server systems 902 can provide different platforms. For example, the server system 902A can provide an Active Server Pages (ASP)-based web server platform, the server system 902B (not shown) can provide a Telnet server platform, and the server system 902N can provide a PHP-based web server platform.

To generate an application using the server-based deployment technique, the compiler application 402 generates the packages 112. Each of the packages is associated with a different platform. The compiler application 402 generates the packages 112 by compiling the layer source code 406 of the application, the application source code 404 of the application, the container source code sets 408 for the platforms, and the binding source code sets 410 for the platforms. Each of the packages 112 includes compiled instructions defining the layer modules 606, the application module 604, a container module, and a binding module. Each of the packages 112 is suitable for installation on the server systems 902 that provide the platform associated with the package.

When an application is deployed using the server-based deployment technique, the packages 112 are distributed to the server systems 902 and installed on the server systems 902. After installation, the server systems 902 execute instructions in the packages 112 to provide the container module 602, the application module 604, the layer modules 606, and the binding module 608.

The computing devices 104 do not include hardware or software that is specific to the application. For example, the computing device 104A can be a standard telephone and the IVR version of the application is installed on the server system 902A. In this example, a user can interact with the application by using the computing device 104A to call the server system 902A. In another example, a user can interact with the application using a general-purpose client application on the computing device 104N. General-purpose client applications include applications that are not tied to a specific server-based application. For example, a user can interact with a web version of the application using a web browser application on the computing device 104N. In another example, a user can interact with a Telnet version of the application using a Telnet client on the computing device 104N.

Figure 10:
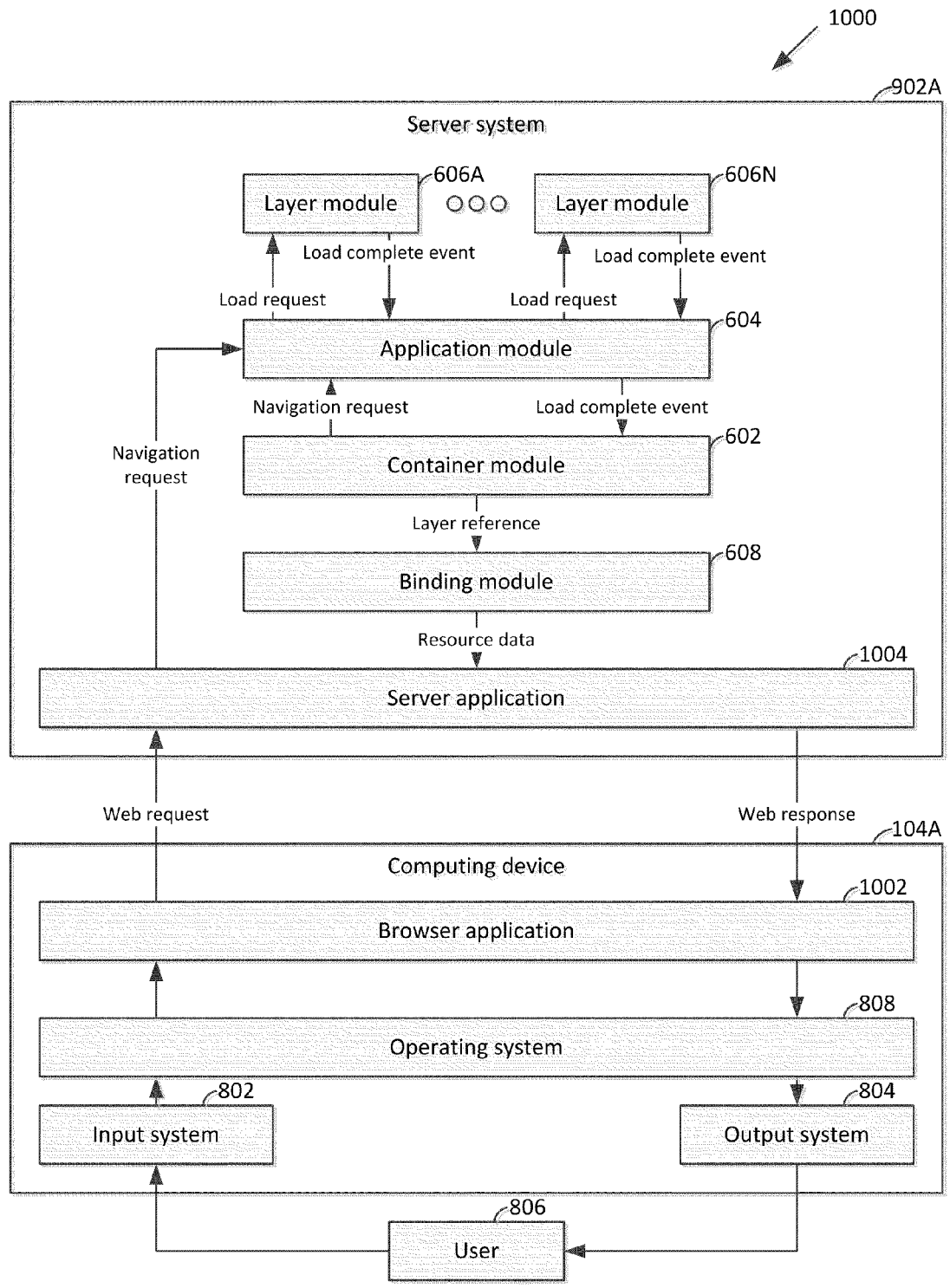
FIG. 10 is a block diagram illustrating an example system for executing an application that uses the server-based deployment technique.

FIG. 10 is a block diagram illustrating an example system 1000 for executing applications that use the server-based deployment technique. As illustrated in the example of FIG. 10, the system 1000 comprises the computing device 104A and the server system 902A. Although the example of FIG. 5 is described with regard to the computing device 104A and the server system 902A, it should be appreciated that other ones of the computing devices 104 and the server systems 902 can employ similar systems for executing applications that use the server-based deployment technique.

Like the computing device 104A illustrated in the example of FIG. 8, the computing device 104A illustrated in the example of FIG. 10 comprises the input system 802, the output system 804, and the operating system 808.

However, instead of including the package 112A, the computing device 104A illustrated in the example of FIG. 10 comprises a browser application 1002. In different embodiments, the browser application 1002 can be different types of web browser applications. For example, the browser application 1002 can be the SAFARI® web browser application from Apple, Inc., the INTERNET EXPLORER® web browser application from Microsoft Corp., the FIREFOX® web browser application from the Mozilla Foundation, the CHROME® web browser application from Google, Inc., or another web browser application.

Although the computing device 104A provides a web browser application in the example of FIG. 10, it should be appreciated that in some instances where the application is deployed using the server-based deployment technique, the computing device 104A provides other types of general-purpose client applications instead of the browser application 1002. For example, the computing device 104A can provide a telnet client instead of the browser application 1002. Furthermore, in some instances where the application is deployed using the server-based deployment technique, the computing device 104A does not provide a general-purpose client application or an operating system.

The server system 902A provides the container module 602, the application module 604, the layer modules 606, and the binding module 608. The container module 602, the application module 604, the layer modules 606, and the binding module 608 illustrated in the example of FIG. 10 operate in a similar way to the container module 602, the application module 604, the layer modules 606, and the binding module 608 illustrated in the example of FIG. 6.

The server system 902A also provides a server application 1004. To use the application, the user 806 uses the input system 802 to interact with the browser application 1002. The browser application 1002 sends a web request to the server application 1004. The web request specifies a layer URI of a layer in the application. When the server application 1004 receives the web request, the server application 1004 provides a navigation request to the application module 604. The application module 604 processes the navigation request as previously described. Subsequently, the binding module 608 generates resource data. The resource data represents the layer indicated by the layer URI. When the server application 1004 receives the resource data, the server application 1004 sends a web response to the browser application 1002 as a response to the web request. The web response contains the resource data.

When the browser application 1002 receives the web response, the browser application 1002 uses the output system 804 to present the layer to the user 806. Subsequently, the user 806 can select a navigation element of the layer. When the user 806 selects the navigation element, the browser application 1002 sends another web request to the server application 1004. The other web request specifies the layer URI of another layer in the application. The server application 1004 processes this web request in the same way as the previous web request.

Figure 11:
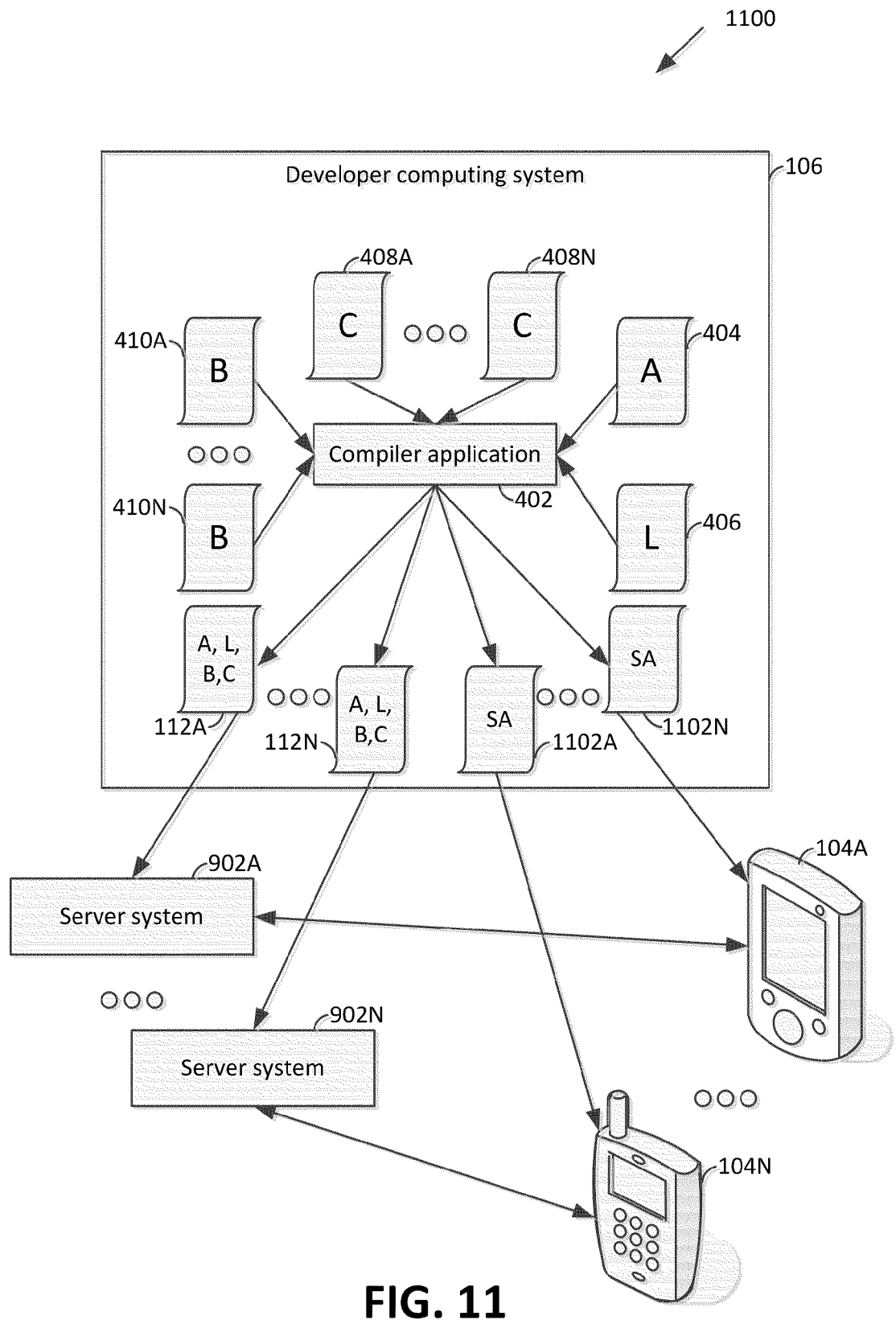
FIG. 11 is a block diagram illustrating an example system for developing and distributing an application that uses a client shell deployment technique.

FIG. 11 is a block diagram illustrating an example system 1100 for developing and distributing applications that use the client shell deployment technique. The system 1100 comprises the developer computing system 106. In addition, the system 1100 comprises the server systems 902 and the computing devices 104.

To generate an application using the client shell deployment technique, the compiler application 402 generates the packages 112 and shell application packages 1102A through 1102N (collectively, "shell application packages 1102"). Each of the packages 112 is associated with a different platform. Each of the shell application packages 1102 is associated with a different platform.

The compiler application 402 generates the packages 112 by compiling the layer source code 406, the application source code 404, the container source code sets 408, and the binding source code sets 410. Each of the packages 112 includes compiled instructions defining the one or more layer modules 606, the application module 604, a container module, and a binding module. Each of the packages 112 is suitable for installation on the server systems 902 that provide the platform associated with the package. Each of the shell application packages 1102 comprises instructions that provide shell applications when executed on computing devices that provide the platform associated with the shell application package.

After the compiler application 402 builds the packages 112, the packages 112 are distributed to and installed on the server systems 902. In addition, the shell application packages 1102 are installed on the computing devices 104. After the shell application packages 1102 are installed on the computing devices 104, the computing devices 104 execute computer-readable instructions in the shell application packages

1102 that cause the computing devices 104 to provide shell applications. The shell operations operate natively on the computing devices 104.

From the perspective of users of the computing devices 104, the shell applications appear to be performing all operations of the application. However, in reality, the shell applications are actually sending navigation requests to the server systems 902, receiving serialized interface data from the server systems 902, and using the serialized interface data to present layers of the application to the users. Various embodiments format the serialized interface data in various ways. For example, the serialized interface data can be formatted as HTML data, XML data, image data, or other data formatted in other ways. The client shell deployment technique can be useful in situations where it is advantageous to have the work of the application done away from the computing devices 104, yet provide the appearance that the application is being provided by the computing devices 104.

Figure 12:
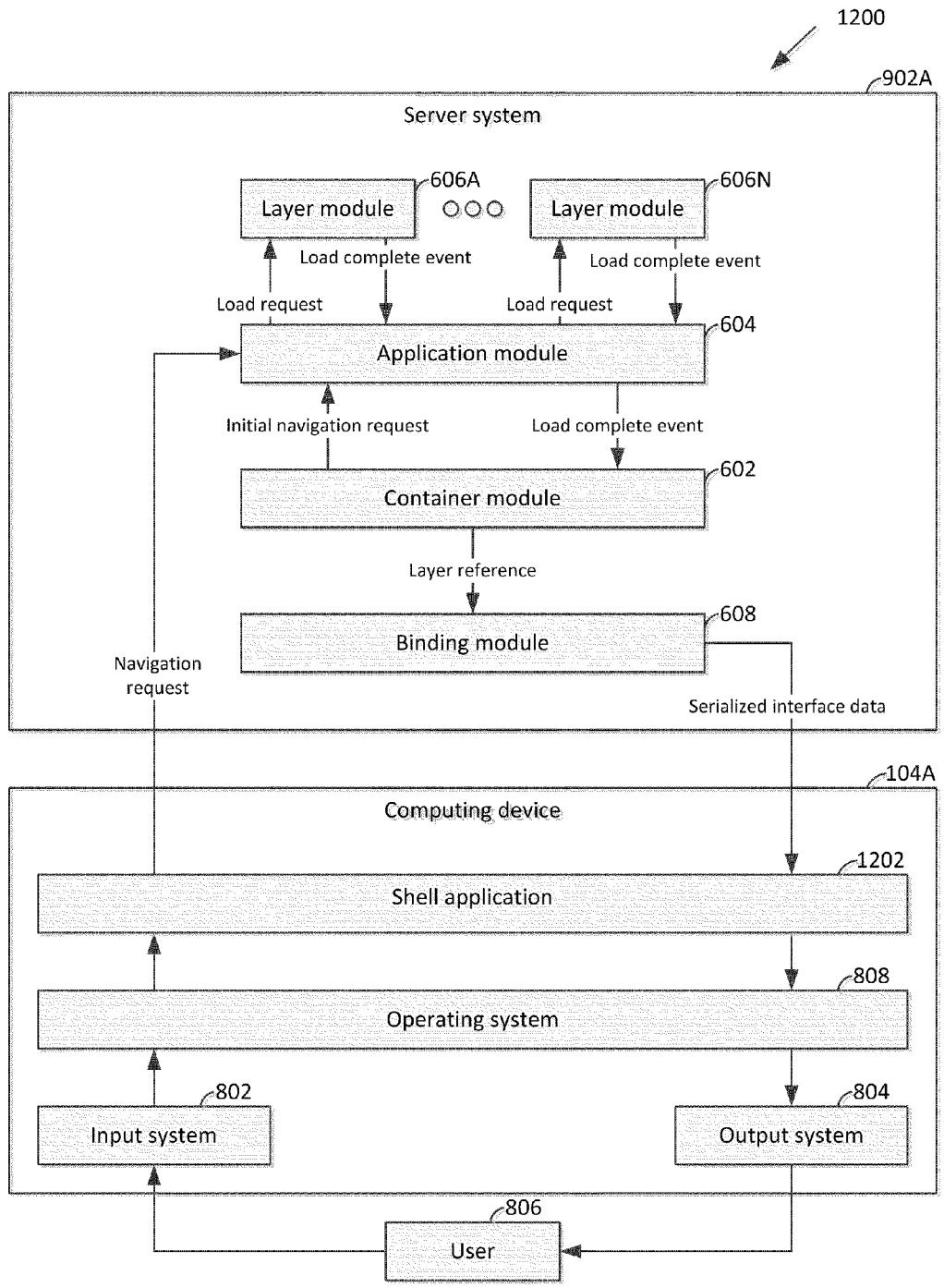
FIG. 12 is a block diagram illustrating an example system for executing an application that uses the client shell deployment technique.

FIG. 12 is a block diagram illustrating an example system 1200 for executing applications that use the client shell deployment technique. As illustrated in the example of FIG. 12, the system 1200 comprises the computing device 104A and the server system 902A. Although the example of FIG. 12 is described with regard to the computing device 104A and the server system 902A, it should be appreciated that other ones of the computing devices 104 and the server systems 902 can employ similar systems for executing applications that use the client shell deployment technique.

The computing device 104A illustrated in the example of FIG. 12 is similar to the computing device 104A illustrated in the example of FIG. 8. Like the computing device 104A illustrated in the example of FIG. 8, the computing device 104A illustrated in the example of FIG. 12 provides the input system 802, the output system 804, and the operating system 808. However, the computing device 104A provides a shell application 1202 instead of the browser application 1002. Execution of the instructions in one of the shell application packages 1102 causes the computing device 104A to provide the shell application 1202.

Furthermore, the server system 902A illustrated in the example of FIG. 12 is similar to the server system 902A illustrated in the example of FIG. 10. Like the server system 902A illustrated in the example of FIG. 10, the server system 902A illustrated in the example of FIG. 12 provides the container module 602, the application module 604, the layer modules 606, and the binding module 608.

To use the application, the user 806 uses the input system 802 to instruct the operating system 808 to launch the shell application 1202. When the shell application 1202 launches, the shell application 1202 provides an initial navigation request to the application module 604. The initial navigation request specifies a layer URI of the home layer of the application. The application module 604 processes the navigation request as described elsewhere in this document.

When the binding module 608 processes a layer module, the binding module 608 provides serialized interface data to the shell application 1202. The serialized interface data represents the layer of the application indicated by the layer URI. When the shell application 1202 receives the serialized interface data, the shell application 1202 uses the output system 804 to present the layer of the application to the user 806. The user 806 can select navigation elements of the layer. When the user 806 selects a navigation element of the layer, the shell application provides another navigation request to the container module 602. The other navigation request specifies the layer URI associated with the navigation element.

Figure 13:
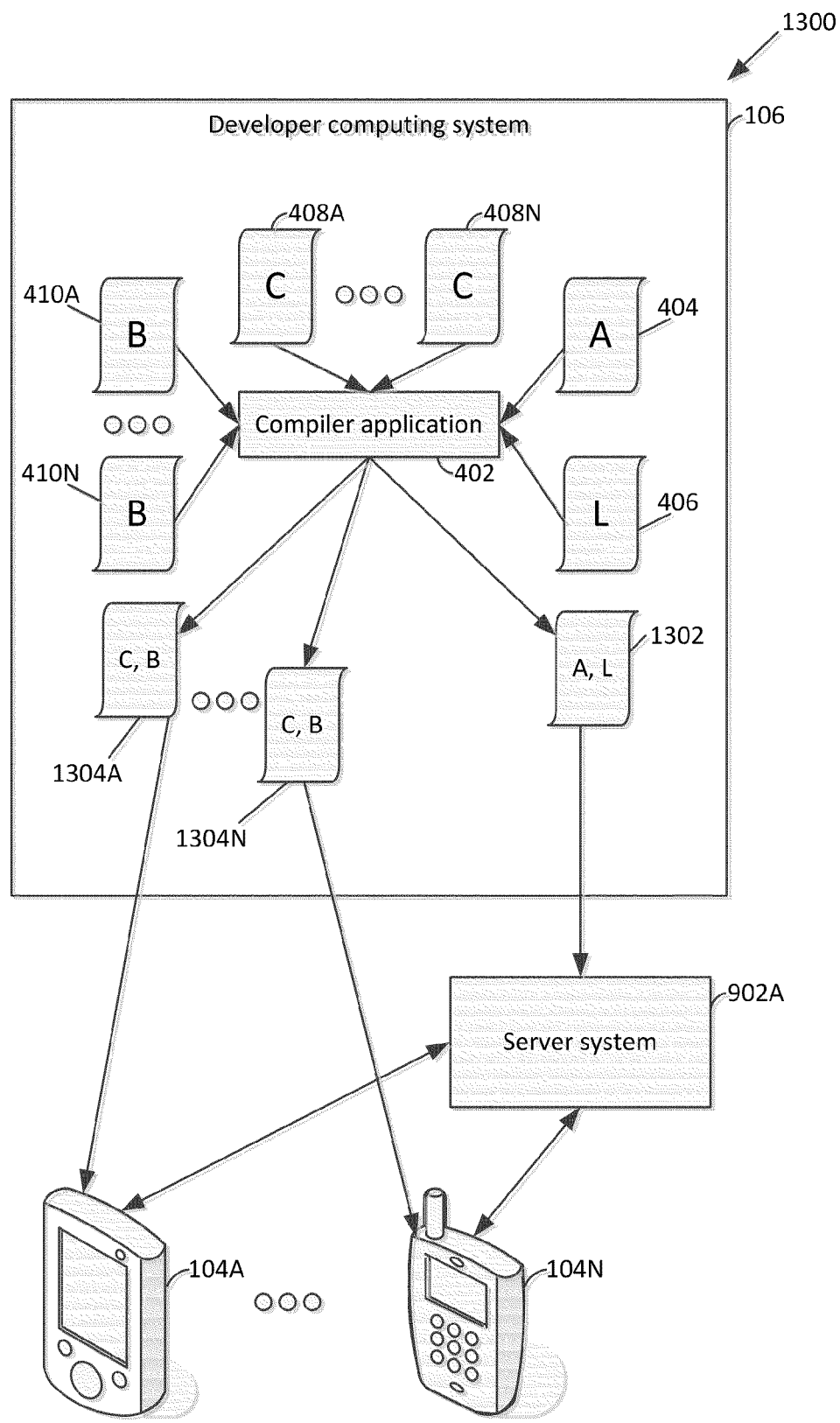
FIG. 13 is a block diagram illustrating an example system for developing and distributing hybrid applications.

FIG. 13 is a block diagram illustrating an example system 1300 for developing and distributing applications that use a hybrid deployment technique. When an application is deployed using the hybrid deployment technique, the container module 602 and the binding module 608 operate on the computing devices 104 and the application module 604 and the layer modules 606 operate on the server systems 902. The hybrid deployment technique can be useful in situations where it is not desirable for platform-specific code to execute on server systems. The system 1300 comprises the developer computing system 106. In addition, the system 1300 comprises the server systems 902 and the computing devices 104.

To generate an application using the hybrid deployment technique, the compiler application 402 generates a server package 1302 for the application. To generate the server package 1302, the compiler application 402 compiles the layer source code 406 and the application source code 404 for the application. Hence, the server package 1302 includes instructions defining one or more layer modules 606 and the application module 604. The server package 1302 is suitable for installation on the platform provided by the server system 902A. After the compiler application 402 generates the server package 1302, the server package 1302 is distributed to and installed on the server system 902A. It should be appreciated that in other embodiments, the server package 1302 is distributed to and installed on other ones of the server systems 902.

Furthermore, to generate an application using the hybrid deployment technique, the compiler application 402 generates client packages 1304A through 1304N (collectively, "client packages 1304") for the selected platforms. The compiler application 402 generates the client packages 1304 by compiling the container source code sets 408 and the binding source code sets 410 for the selected platforms. Hence, the client packages 1304 include instructions that define the container module 602 and the binding module 608. The instructions in each of the client packages 1304 are suitable for native execution on different platforms. After the compiler application 402 generates the client packages 1304, the client packages 1304 are distributed to and installed on the computing devices 104.

Figure 14:
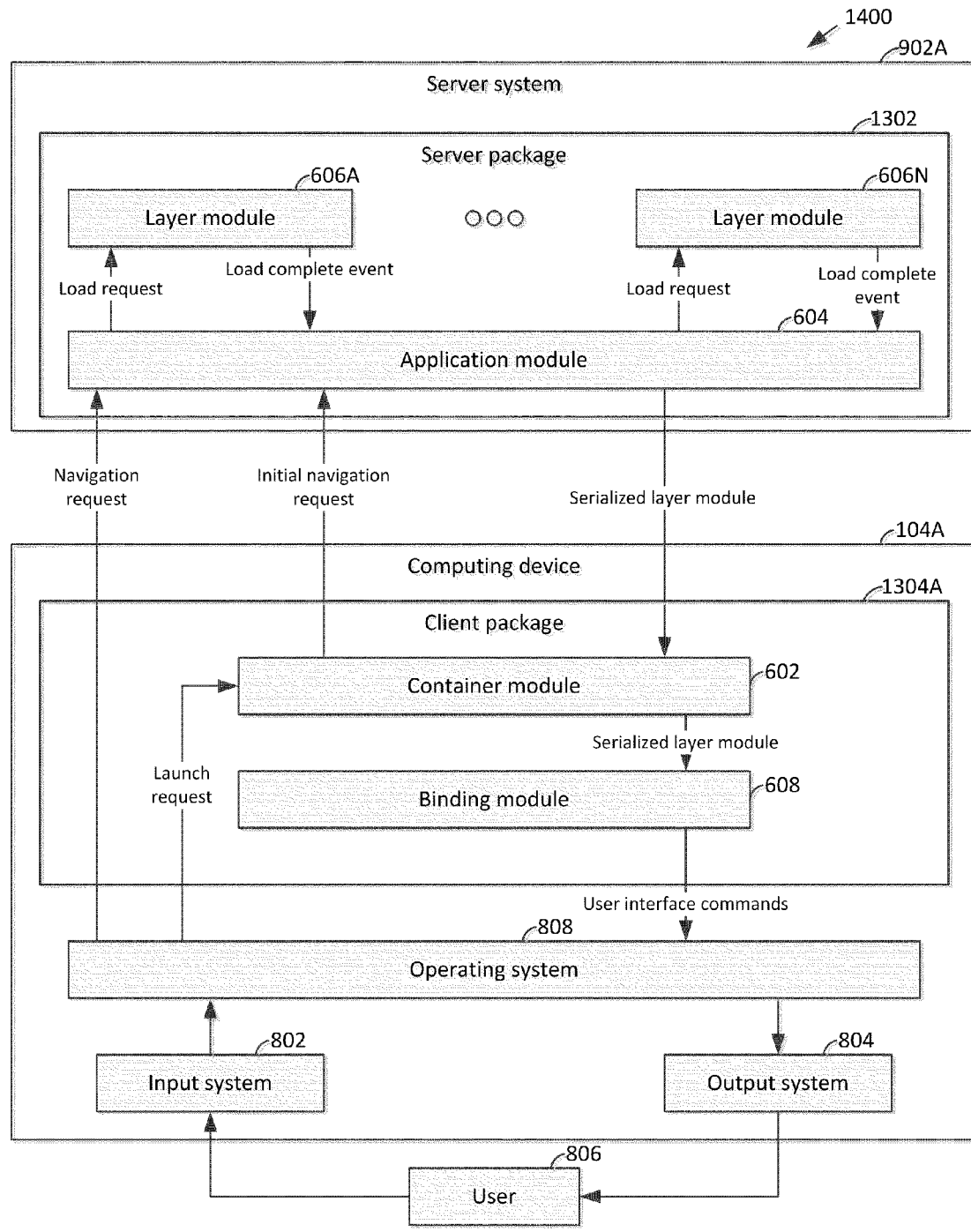
FIG. 14 is a block diagram illustrating an example system for executing hybrid applications.

FIG. 14 is a block diagram illustrating an example system 1400 for executing applications that use the hybrid deployment technique. As illustrated in the example of FIG. 14, the system 1400 comprises the computing device 104A and the server system 902A. Although the example of FIG. 14 is described with regard to the computing device 104A and the server system 902A, it should be appreciated that other ones of the computing devices 104 and the server systems 902 can employ similar systems for executing applications that use the hybrid deployment technique.

The computing device 104A illustrated in the example of FIG. 14 is similar to the computing device 104A illustrated in the example of FIG. 8. Like the computing device 104A illustrated in the example of FIG. 8, the computing device 104A illustrated in the example of FIG. 14 provides the input system 802, the output system 804, and the operating system 808. However, instead of the package 112A, the computing device 104A comprises the client package 1304A. The client package 1304A provides the container module 602 and the binding module 608 of the application, but not the application module 604 or the layer modules 606 of the application.

Furthermore, the server system 902A illustrated in the example of FIG. 14 is similar to the server system 902A illustrated in the example of FIG. 9. However, the server system 902A illustrated in the example of FIG. 14 comprises the server package 1302. The server package 1302 provides the application module 604 and the layer modules 606 of the application, but not the container module 602 or the binding module 608 of the application.

To use the application, the user 806 uses the input system 802 to instruct the operating system 808 to launch the application. When the application launches, the container module 602 provides an initial navigation request to the application module 604 at the server system 902A. The initial navigation request specifies a layer URI of the home layer of the application. The application module 604 processes the initial navigation request as described elsewhere in this document.

Subsequently, the container module 602 receives a load complete event from the application module 604. The load complete event comprises a serialized version of a layer module. The container module 602 provides the serialized version of the layer module to the binding module 608 at the computing device 104A. The binding module 608 then processes the serialized version of the layer module. When the binding module 608 processes the serialized version of the layer module, the binding module 608 outputs user interface commands that cause the operating system 808 to use the output system 804 to display the layer to the user 806. The user 806 can select navigation elements of the layer. When the user 806 selects a navigation element of the layer, the operating system 808 provides another navigation request to the container module 602. The other navigation request specifies the layer URI associated with the navigation element.

Figure 15:
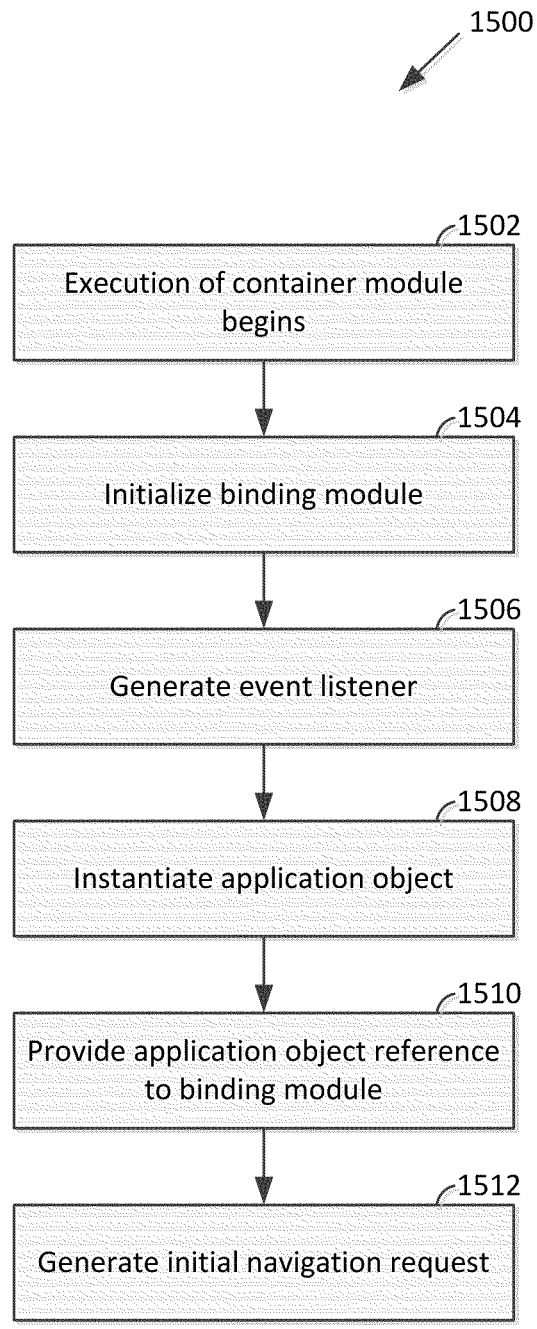
FIG. 15 is a flowchart illustrating an example operation of a container module.

FIG. 15 is a flowchart illustrating an example initialization operation 1500 of the container module 602. The example of FIG. 15 describes embodiments in which the container module 602, the application module 604, the layer modules 606, and the binding module 608 are implemented in a specific way. It should be appreciated that in other embodiments, the container module 602, the application module 604, the layer modules 606, and the binding module 608 are implemented in other ways.

As illustrated in the example of FIG. 15, the initialization operation 1500 begins when execution of the container module 602 begins (1502). In various embodiments, execution of the container module 602 can begin at various times. For example, in some embodiments, execution of the container module 602 begins when the operating system 808 launches the application in response to input from the user 806. In other embodiments, execution of the container module 602 begins when the server application 1004 starts at the server system 902A. In yet other embodiments, execution of the container module 602 starts when one of the server systems 902 starts. In yet other embodiments, execution of the container module 602 starts when the server system 902A first receives a web request or a navigation request for the container module 602.

After execution of the container module 602 begins, the container module 602 initializes the binding module 608 (1504). In some embodiments, the binding module 608 follows a factory design pattern. In such embodiments, the container module 602 initializes the binding module 608 by invoking a static initialize method of the binding module 608.

Different binding modules can perform different actions when the container module 602 initializes the binding module. For example, invocation of the initialization methods of some binding modules causes the computing device 104A to display a splash screen. In this example, invocation of the initialization methods of other binding modules does not cause the computing device 104A to perform any actions.

Next, the container module 602 generates an event listener (1506). In the example of FIG. 15, the application source code 404 defines an abstract application class. The abstract application class defines an application initialization operation and a navigation operation. The event listener listens for load complete events generated by the abstract application class. As mentioned elsewhere in this document, load complete events comprise layer references. In instances where the developer 102 selects the client-based, the server-based, or the shell application deployment techniques, load complete events include layer references and the event listener provides the layer references to the binding module 608. In instances where the developer 102 selects the hybrid deployment technique, load complete events contain serialized versions of layer modules and the event listener provides the serialized versions of the layer modules to the binding module 608.

The container module 602 then instantiates the application module 604 (1508). The application module 604 is an instance of an application class defined in the application source code 404. The application class extends the abstract application class. The application class overrides the application initialization operation defined by the abstract application class. The application initialization operation of the application module 604 is invoked whenever the application class is instantiated.

When executed, the application initialization operation of the application module 604 instantiates the layer modules 606. Each of the layer modules 606 is an instance of a different layer class defined in the layer source code 406. Each of the layer classes extends an abstract layer class. The abstract layer class defines a load operation. Each of the layer classes implements the load operation in different ways. Consequently, the load operations of layer modules have different behavior.

Furthermore, when executed, the application initialization operation of the application module 604 generates a navigation map that maps layer URIs to the layer modules. The navigation map is a software object that maps layer URIs to the layer modules. Different applications have different application classes. The different application classes implement different application initialization methods. Hence, different applications can initialize different navigation maps.

The application initialization operation also initializes a style for the application. The style for the application can control the appearance of text in the application. In some embodiments, styles can also be initialized for individual layers or types of content elements.

The following is example code application class used in some embodiments:

```
using System;
using System.Collections.Generic;
using System.Linq;
using System.Text;
using iFactr.Core;
using iFactr.Core.Styles;
namespace Bestsellers
{
    public class App : iApp
        public override void OnAppLoad( )
        {
            // Set the application title
            Title = "Best Sellers";
            // Add navigation mappings
            NavigationMap.Add("", new CategoryList( ));
            NavigationMap.Add("{Category}", new BookList( ));
            NavigationMap.Add("{Category}/{Book}",
                new BookDetails( ));
            // Set default navigation URI
            NavigateOnLoad = "";
            // Set the application style
            Style = new Style( )
```

```
            {
                HeaderColor = new Style.Color(0,0,0),
            };
        }
    }
}
```

After instantiating the application object, the container module 602 provides an application object reference to the binding module 608 (1510). The application object reference is a reference to the application object. In the example of FIG. 15, the binding module 608 has an application property. The container module 602 assigns the application object reference to the application property of the binding module 608.

The container module 602 then generates an initial navigation request (1512). The initial navigation request specifies the layer URI of the home layer of the application. In the example of FIG. 15, the container module 602 generates the initial navigation request by invoking a navigate method of the abstract application class, providing the layer URI of the home layer as a parameter.

The following is example container source code used with a Console binding, The Console binding can be used with Telnet platforms:

```
using System;
using System.Collections.Generic;
using System.Linq;
using System.Text;
using iFactr.Console;
using iFactr.Core;
using iFactr.Core.Layers;
namespace Example.Console.Container
{
    class Program
    {
        static void Main(string[ ] args)
        {
            ConsoleFactory.Initialize( );
            iApp.OnLayerLoadComplete += (iLayer layer) => {
ConsoleFactory.Instance.OutputLayer(layer); };
            ConsoleFactory.TheApp = new Example.App( );
            iApp.Navigate(ConsoleFactory.TheApp.NavigateOnLoad);
        }
    }
}
```

The following is example container source code used with a Compact binding. The Compact binding can be used with MICROSOFT WINDOWS CE platforms.

```
using System;
using System.Linq;
using System.Collections.Generic;
using System.Windows.Forms;
using iFactr.Core;
using iFactr.Core.Layers;
using iFactr.Compact;
namespace Example
{
    static class Program
    {
        /// <summary>
        /// The main entry point for the application.
        /// </summary>
        [MTAThread]
        static void Main( )
        {
            CompactFactory.Initialize( );
            iApp.OnLayerLoadComplete += (iLayer layer) => {
CompactFactory.Instance.OutputLayer(layer); };
            //TODO: Instantiate your iFactr application and set the Factory App property
            //Example: CompactFactory.TheApp = new MyApp.App( );
            CompactFactory.TheApp = new Example.App( );
            iApp.Navigate(CompactFactory.TheApp.NavigateOnLoad);
            Application.Run(CompactFactory.Instance.Form);
        }
    }
}
```

The following is example container source code used with a MonoTouch binding. The MonoTouch binding can be used with the APPLE IPHONE and the APPLE IPAD platforms.

```
using System;
using System.Collections.Generic;
using System.Linq;
using MonoTouch.Foundation;
using MonoTouch.UIKit;
using iFactr.Core;
using iFactr.Core.Layers;
using iFactr.Touch;
namespace Example
{
    public class Application
    {
        static void Main (string[ ] args)
        {
            UIApplication.Main (args, null, "AppDelegate");
        }
    }
    [Register ("AppDelegate")]
    public partial class AppDelegate : UIApplicationDelegate
    {
```

-continued

```
        public override bool FinishedLaunching (UIApplication app, NSDictionary
options)
                {
                        TouchFactory.Initialize( );
                        iApp.OnLayerLoadComplete += (iLayer layer) => {
InvokeOnMainThread(delegate { TouchFactory.Instance.OutputLayer(layer); }
);        };
                        TouchFactory.TheApp = new Example.App( );
                        iApp.Navigate(TouchFactory.TheApp.NavigateOnLoad);
                        return true;
                }
                public override void OnActivated (UIApplication application)
                {
                }
        }
}
```

Figure 16:
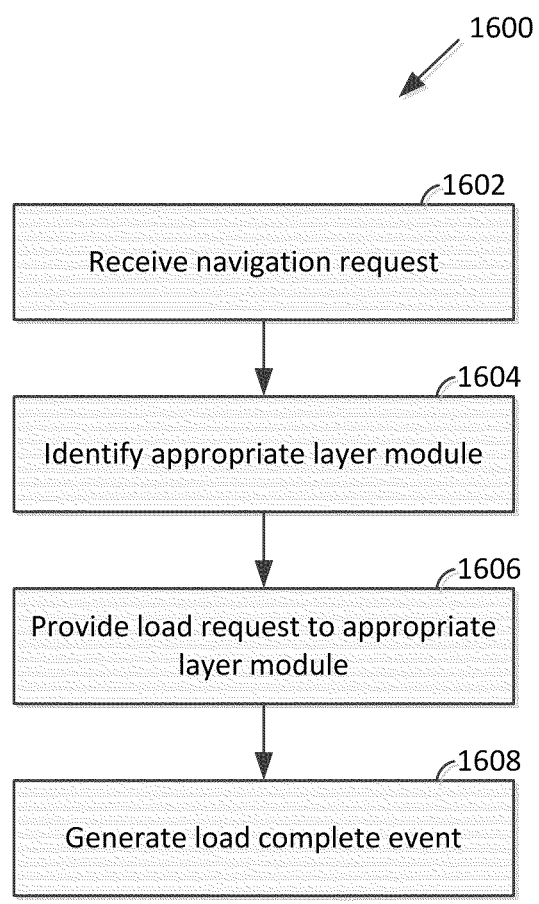
FIG. 16 is a flowchart illustrating an example navigation operation of an application module.

FIG. 16 is a flowchart illustrating an example navigation operation 1600 of the application module 604. In some embodiments, the application module 604 performs the navigation operation 1600 each time the application module 604 receives a navigation request.

As illustrated in the example of FIG. 16, the navigation operation 1600 starts when the application module 604 receives a navigation request (1602). The navigation request specifies a layer URI. The layer URI comprises a root portion and a parameter portion. The parameter portion of a layer URI comprises zero or more parameters. Each of the parameters is a name-value pair. For example, "http://example.com/booksapp?bookId=234&lang=eng" can be a layer URI. In this example, "http://example.com/booksapp" is the root portion of the layer URI. In this example, the parameter portion of the layer URI comprises two parameters: "bookId=234" and "lang=eng".

In response to receiving the navigation request, the application module 604 uses the layer URI specified by the navigation request to identify the appropriate layer module (1604). The appropriate layer module is one of the layer modules 606. In various embodiments, the application module 604 identifies the appropriate layer module in various ways. For example, in some embodiments, the application module 604 uses a navigation map to identify the appropriate layer module. In this example, the navigation map comprises a set of entries. Each entry maps any layer URI that satisfies a regular expression to a particular one of the layer modules 606.

After identifying the appropriate layer module, the application module 604 provides a load request to the appropriate layer module (1606). In various embodiments, the application module 604 provides the load request to the appropriate layer module in various ways. For example, in some embodiments, the application module 604 provides the load request to the appropriate layer module by calling a load operation of the appropriate layer module. When the application module 604 calls the load operation of the appropriate layer module, the application module 604 provides the parameters specified in the layer URI to the load operation.

The appropriate layer module can perform a variety of activities to load content into the appropriate layer module. For example, the appropriate layer module can obtain data from the Internet and load that data into various content items in the layer. In this example, the appropriate layer module can pull a list of best selling books from a website and put a title of each of the books into a list item in a list in the layer. In another example, the appropriate layer module can interact with cameras, microphones, speakers, and other types of features of the computing devices 104 to load content into the layer. In this example, such interaction is only possible with some types of mobile devices.

After calling the load operation on the appropriate layer module, the application module 604 generates a load complete event (1608). The load complete event comprises a layer reference. The layer reference indicates a location that stores the layer data structure generated by the load operation of the appropriate layer module.

Figure 17:
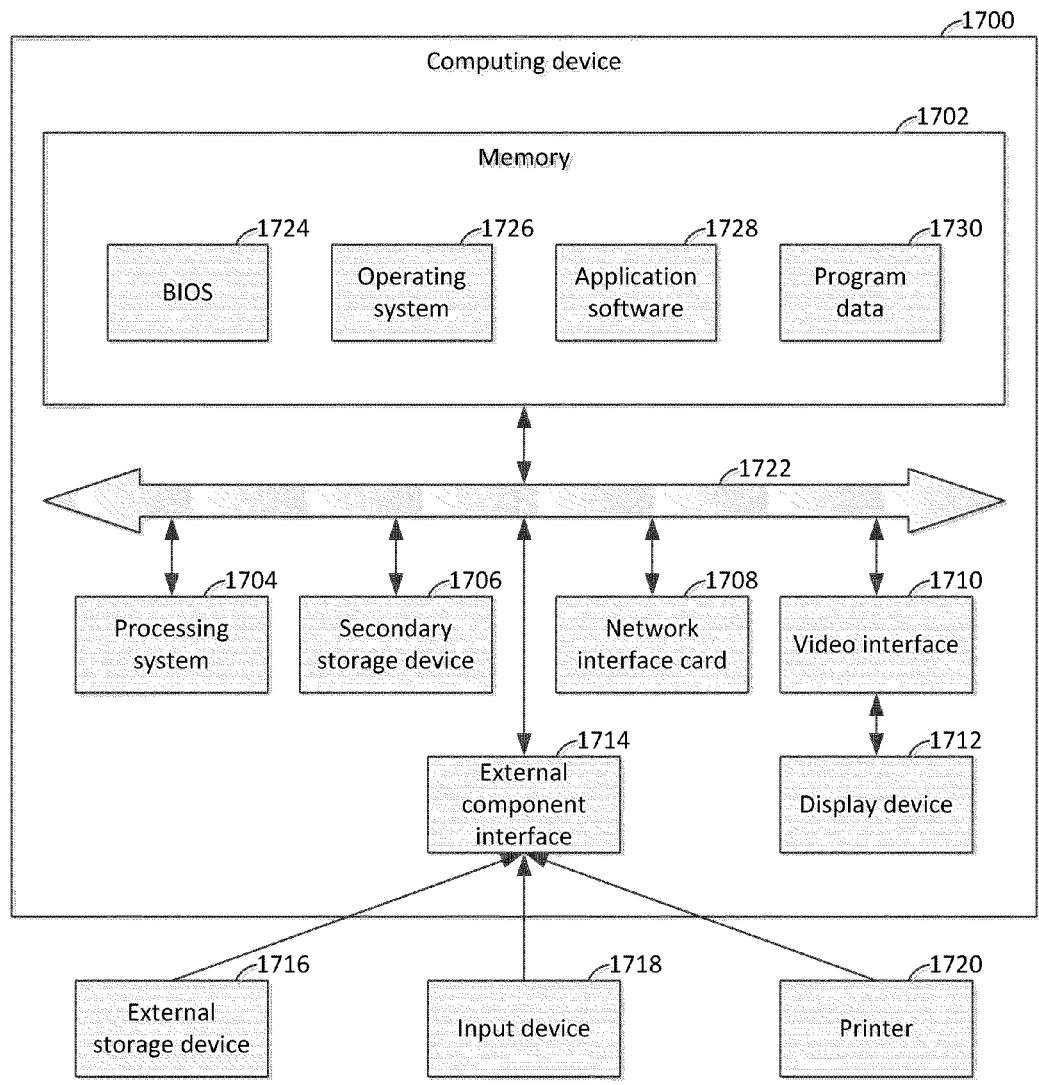
FIG. 17 is a block diagram illustrating an example computing device.

FIG. 17 is a block diagram illustrating an example computing device 1700. In some embodiments, the developer computing system 106, the computing devices 104, and/or the server systems 902 are implemented using one or more computing devices like the computing device 1700. It should be appreciated that in other embodiments, the developer computing system 106, the computing devices 104, and/or the server systems 902 are implemented using computing devices having hardware components other than those illustrated in the example of FIG. 17.

In different embodiments, computing devices are implemented in different ways. For instance, in the example of FIG. 17, the computing device 1700 comprises a memory 1702, a processing system 1704, a secondary storage device 1706, a network interface card 1708, a video interface 1710, a display device 1712, an external component interface 1714, an external storage device 1716, an input device 1718, a printer 1720, and a communication medium 1722. In other embodiments, computing devices are implemented using more or fewer hardware components. For instance, in another example embodiment, a computing device does not include a video interface, a display device, an external storage device, or an input device.

The memory 1702 includes one or more computer-readable data storage media capable of storing data and/or instructions. As used in this document, a data storage medium is a device or article of manufacture that stores data and/or software instructions readable by a computing device. In different embodiments, the memory 1702 is implemented in different ways. For instance, in various embodiments, the memory 1702 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system 1704 includes one or more physical integrated circuits that selectively execute software instructions. In various embodiments, the processing system 1704 is implemented in various ways. For instance, in one example embodiment, the processing system 1704 is implemented as one or more processing cores. For instance, in this example embodiment, the processing system 1704 may be implemented as one or more Intel CORE™ series microprocessors. In another example embodiment, the processing system 1704 is implemented as one or more separate microprocessors or microcontrollers. In yet another example embodiment, the processing system 1704 is implemented as an ASIC that provides specific functionality. In yet another example embodiment, the processing system 1704 provides specific functionality by using an ASIC and by executing software instructions.

In different embodiments, the processing system 1704 executes software instructions in different instruction sets. For instance, in various embodiments, the processing system 1704 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 1706 includes one or more computer-readable data storage media. The secondary storage device 1706 stores data and software instructions not directly accessible by the processing system 1704. In other words, the processing system 1704 performs an I/O operation to retrieve data and/or software instructions from the secondary storage device 1706. In various embodiments, the secondary storage device 1706 is implemented by various types of computer-readable data storage media. For instance, the secondary storage device 1706 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 1708 enables the computing device 1700 to send data to and receive data from a computer communication network. In different embodiments, the network interface card 1708 is implemented in different ways. For example, in various embodiments, the network interface card 1708 is implemented as an Ethernet interface, a token-ring network interface, a fiber optic network interface, a wireless network interface (e.g., WiFi, WiMax, etc.), or another type of network interface.

The video interface 1710 enables the computing device 1700 to output video information to the display device 1712. In different embodiments, the video interface 1710 is implemented in different ways. For instance, in one example embodiment, the video interface 1710 is integrated into a motherboard of the computing device 1700. In another example embodiment, the video interface 1710 is a video expansion card. Example types of video expansion cards include RADEON® graphics cards manufactured by ATI Technologies, Inc. of Markham, Ontario, GEFORCE® graphics cards manufactured by Nvidia Corporation of Santa Clara, Calif., and other types of graphics cards.

In various embodiments, the display device 1712 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 1710 communicates with the display device 1712 in various ways. For instance, in various embodiments, the video interface 1710 communicates with the display device 1712 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 1714 enables the computing device 1700 to communicate with external devices. In various embodiments, the external component interface 1714 is implemented in different ways. For instance, in one example embodiment, the external component interface 1714 is a USB interface. In other example embodiments, the computing device 1700 is a FireWire interface, a serial port interface, a parallel port interface, a PS/2 interface, and/or another type of interface that enables the computing device 1700 to communicate with external components.

In different embodiments, the external component interface 1714 enables the computing device 1700 to communicate with different external components. For instance, in the example of FIG. 17, the external component interface 1714 enables the computing device 1700 to communicate with the external storage device 1716, the input device 1718, and the printer 1720. In other embodiments, the external component interface 1714 enables the computing device 1700 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 1700.

The external storage device 1716 is an external component comprising one or more computer readable data storage media. Different implementations of the computing device 1700 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 1718 is an external component that provides user input to the computing device 1700. Different implementations of the computing device 1700 interface with different types of input devices. Example types of input devices include, but are not limited to, keyboards, mice, trackballs, stylus input devices, key pads, microphones, joysticks, touch-sensitive display screens, and other types of devices that provide user input to the computing device 1700. The printer 1720 is an external device that prints data to paper. Different implementations of the computing device 1700 interface with different types of printers. Example types of printers include, but are not limited to laser printers, ink jet printers, photo printers, copy machines, fax machines, receipt printers, dot matrix printers, or other types of devices that print data to paper.

The communications medium 1722 facilitates communication among the hardware components of the computing device 1700. In different embodiments, the communications medium 1722 facilitates communication among different components of the computing device 1700. For instance, in the example of FIG. 17, the communications medium 1722 facilitates communication among the memory 1702, the processing system 1704, the secondary storage device 1706, the network interface card 1708, the video interface 1710, and the external component interface 1714. In different implementations of the computing device 1700, the communications medium 1722 is implemented in different ways. For instance, in different implementations of the computing device 1700, the communications medium 1722 may be implemented as a PCI bus, a PCI Express bus, an accelerated graphics port (AGP) bus, an INFINIBAND® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1702 stores various types of data and/or software instructions. For instance, in the example of FIG. 17, the memory 1702 stores a Basic Input/Output System (BIOS) 1724, an operating system 1726, application software 1728, and program data 1730. The BIOS 1724 includes a set of software instructions that, when executed by the processing system 1704, cause the computing device 1700 to boot up. The operating system 1726 includes a set of software instructions that, when executed by the processing system 1704, cause the computing device 1700 to provide an operating system that coordinates the activities and sharing of resources of the computing device 1700. Example types of operating systems include, but are not limited to, Microsoft WINDOWS®, Linux, Unix, Apple OS X®, Apple IOS®, HP WEBOS®, Google CHROME® OS, Google ANDROID® OS, and so on. The application software 1728 includes a set of software instructions that, when executed by the processing system 1704, cause the computing device 1700 to provide applications to a user of the computing device 1700. The program data 1730 is data generated and/or used by the application software 1728.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can the steps of the operations shown in the figures in different orders.

The claimed invention is:

1. A method comprising:
    inputting of business logic source code, the business logic source code not containing substantial amounts of code specific to any platform and the business logic source code defines substantially all functionality of the application that is specific to an application;
    compiling platform-specific code associated with a first platform and the business logic source code, thereby generating a first set of computer-executable instructions,
    distributing the first set of computer-executable instructions to devices that provide the first platform and that are capable of executing the first set of computer-executable instructions, executing the first set of computer-executable instructions causing the devices that provide the first platform to provide the application; and
    compiling platform-specific code associated with a second platform and the business logic source code, thereby generating a second set of computer-executable instructions,
    distributing the second set of computer-executable instructions to devices that provide the second platform and that are capable of executing the second set of computer-executable instructions, executing the second set of computer-executable instructions causing the devices that provide the second platform to provide the application wherein generating the first set of computer-executable instructions comprises compiling a first set of platform-specific code, the first set of platform-specific code being specific to the first platform; and wherein generating the second set of computer-executable instructions comprise compiling a second set of platform-specific code, the second set of platform-specific code being specific to the second platform, wherein generating the first set of computer-executable instructions comprises compiling layer source code, the layer source code not containing code specific to the first platform or the second platform the layer source code defining a layer class that comprises a load operation that loads content into a layer module, the layer module being an instance of the layer class; wherein generating the second set of computer-executable instructions comprises compiling the layer source code; wherein the first set of platform-specific code defines an operation that, when executed on the first platform, uses the layer module to generate output data usable to present a layer to a user; and wherein the second set of platform-specific code defines an operation that, when executed on the second platform, uses the layer module to generate output data usable to present the layer to another user.

2. The method of claim 1,
    wherein distributing the first set of computer-executable instructions comprises making the first set of computer-executable instructions available for purchase at an application store; and
    wherein distributing the second set of computer-executable instructions comprises making the second set of computer-executable instructions available for purchase at the application store or another application store.

3. A method comprising:
    generating a first set of computer-executable instructions by compiling a first set of source code, the first set of source code including business logic source code, the first set of computer-executable instructions suitable for execution on a first platform;
    generating a second set of computer-executable instructions by compiling a second set of source code, the second set of source code including the business logic source code, the second set of computer-executable instructions suitable for execution on a second platform,
    wherein the business logic source code is substantially free of code specific to the first platform and substantially free of code specific to the second platform,
    wherein the business logic source code defines substantially all functionality of the application that is specific to the application;
    distributing the first set of computer-executable instructions to devices that provide the first platform and that are capable of executing the first set of computer-executable instructions;
    executing the first set of computer-executable instructions causing the devices that provide the first platform to provide the application;
    causing the devices that provide the first platform to provide the application;
    distributing the second set of computer-executable instructions to devices that provide the second platform and that are capable of executing the second set of computer-executable instructions;
    executing the second set of computer-executable instructions; and
    causing the devices that provide the second platform to provide the application wherein generating the first set of computer-executable instructions comprises compiling a first set of platform-specific code, the first set of platform-specific code being specific to the first platform; and wherein generating the second set of computer-executable instructions comprise compiling a second set of platform-specific code, the second set of platform-specific code being specific to the second platform, wherein generating the first set of computer-executable instructions comprises compiling layer source code, the layer source code not containing code specific to the first platform or the second platform, the layer source code defining a layer class that comprises a load operation that loads content into a layer module, the layer module being an instance of the layer class; wherein generating the second set of computer-executable instructions comprises compiling the layer source code; wherein the first set of platform-specific code defines an operation that, when executed on the first platform, uses the layer module to generate output data usable to present a layer to a user; and wherein the second set of platform-specific code defines an operation that, when executed on the second platform, uses the layer module to generate output data usable to present the layer to another user.

4. The method of claim 1, further comprising: copying the first set of platform-specific code from a data storage system provided by an outside party.

5. The method of claim 1,
wherein the application has a set of layers, each of the layers associated with a layer URI; and
wherein generating the first set of computer-executable instructions comprises compiling application source code, the application source code not containing code specific to the first platform or the second platform, the application source code defining functionality of an application module, the application module having a navigation operation that is invoked when a navigation request is received, the navigation operation providing a load request to the layer module when a layer URI specified by the navigation request is associated with the layer module, the load request comprising a request to perform the load operation of the layer module.

6. The method of claim 5,
wherein the first set of platform-specific code defines functionality of a first binding module, the first binding module having a layer output operation that processes layer modules to generate output data usable to present layers using user interface features that are native to the first platform; and
wherein the second set of platform-specific code defines functionality of a second binding module, the second binding module having a different layer output operation that processes layer modules to generate output data usable to present the layers using user interface features that are native to the second platform.

7. The method of claim 6, wherein generating the first set of computer-executable instructions comprises generating a first package, the first package comprising computer-executable instructions that define functionality of the layer module, the application module, and the first binding module, the first package suitable for installation on computing devices that provide the first platform.

8. The method of claim 5, further comprising generating a shell application package that comprises computer-executable instructions that when executed on a device cause the device to provide a shell application that appears to be performing operations of the application, the shell application actually sending navigation requests to the application module and receiving serialized interface data from the first binding module, the application module and the first binding module operating at a server system.

9. The method of claim 5, wherein generating the set of instructions comprises:
generating a client package that comprises instructions that define functionality of the first binding module, the client package suitable for installation on computing devices that provide the first platform; and
generating a server package that comprises instructions that define functionality of the layer module and the application module, the server package suitable for installation on server devices.

10. The method of claim 3, further comprising:
wherein distributing the first set of computer-executable instructions comprises pushing the first set of computer-executable instructions out to devices in an organization that provide the first platform; and
wherein distributing the second set of computer-executable instructions comprises pushing the second set of computer-executable instructions out to devices in the organization that provide the second platform.

11. The method of claim 3, wherein the business logic source code does not include code that is conditionally executed depending on which platform is running the application.

12. A method comprising:
obtaining a first set of platform-specific code and a second set of platform-specific code from one or more outside parties, the first set of platform-specific code being associated with a first platform, the second set of platform-specific code being associated with a second platform;
developing business logic source code for a first application, the business logic source code defining substantially all functionality of the first application that is specific to the first application, the first set of platform-specific code and the second-set of platform specific code being substantially free of code specific to the first application;
using one or more computing devices to generate a first set of computer-executable instructions and a second set of computer-executable instructions,
wherein the one or more computing devices generate the first set of computer-executable instructions by compiling a first set of source code, the first set of source code including the business logic source code and the first set of platform-specific code; and
wherein the one or more computing devices generate the second set of computer-executable instructions by compiling a second set of source code, the second set of source code including the business logic source code and the second set of platform-specific code;
installing the first set of computer-executable instructions on a first device, the first device providing the first platform, execution of the first set of computer-executable instructions by the first device causing the first device to present user interfaces of the first application using only user interface features that are native to the first platform; and
installing the second set of computer-executable instructions on a second device, the second device providing the second platform, execution of the second set of computer-executable instructions by the second device causing the second device to present the user interfaces of the first application using only user interface features that are native to the second platform wherein generating the first set of computer-executable instructions comprises compiling a first set of platform-specific code, the first set of platform-specific code being specific to the first platform; and wherein generating the second set of computer-executable instructions comprise compiling a second set of platform-specific code, the second set of platform-specific code being specific to the second platform, wherein generating the first set of computer-executable instructions comprises compiling layer source code, the layer source code not containing code specific to the first platform or the second platform, the layer source code defining a layer class that comprises a load operation that loads content into a layer module, the layer module being an instance of the layer class; wherein generating the second set of computer-executable instructions comprises compiling the layer source code; wherein the first set of platform-specific code defines an operation that, when executed on the first platform, uses the layer module to generate output data usable to present a layer to a user; and wherein the second set of platform-specific code defines an operation that, when executed on the second platform, uses the layer module to generate output data usable to present the layer to another user.

13. The method of claim 12, further comprising:
developing business logic source code for a second application; and
using the business logic source code for the second application, the first set of platform-specific source code, and the second set of platform-specific source code to generate sets of computer-executable instructions suitable for execution on the first and second platforms.

14. A computing system comprising:
one or more data storage media that store:
computer-executable instructions; and
business logic source code for an application, the business logic source code substantially free from source code specific to any platform, the business logic source code defining substantially all functionality of the application that is specific to the application; and
a processing unit that reads the instructions from the one or more data storage media and executes the instructions, execution of the instructions by the processing unit causing the computing system to use the business logic source code to generate multiple packages, the packages suitable for execution on different platforms, execution of the packages on the platforms causing computing devices that provide the platforms to provide the application wherein generating a first set of computer-executable instructions comprises compiling a first set of platform-specific code, the first set of platform-specific code being specific to a first platform; and wherein generating a second set of computer-executable instructions comprise compiling a second set of platform-specific code, the second set of platform-specific code being specific to a second platform, wherein generating the first set of computer-executable instructions comprises compiling layer source code, the layer source code not containing code specific to the first platform or the second platform, the layer source code defining a layer class that comprises a load operation that loads content into a layer module, the layer module being an instance of the layer class; wherein generating the second set of computer-executable instructions comprises compiling the layer source code; wherein the first set of platform-specific code defines an operation that, when executed on the first platform, uses the layer module to generate output data usable to present a layer to a user; and wherein the second set of platform-specific code defines an operation that, when executed on the second platform, uses the layer module to generate output data usable to present the layer to another user.

15. The computing system of claim 14, wherein the different platforms include platforms provided by different types of mobile devices.

16. A non-transitory computer-readable data storage medium that stores instructions that, when executed by a processing unit of a computing system, cause the computing system to:
generate a first set of instructions by compiling platform-specific code associated with a first platform and business logic source code, execution of the first set of instructions causing devices that provide the first platform to provide an application, the business logic source code not containing substantial amounts of code specific to any platform, the business logic source code defining substantially all functionality of the application that is specific to the application; and
generate a second set of instructions by compiling platform-specific code associated with a second platform and the business logic source code, execution of the second set of instructions causing devices that provide the second platform to provide the application;
wherein the business logic source code defines a plurality of layers;
wherein execution of the first set of instructions causes the devices that provide the first platform to load content into the layers and to display the content in the layers using user interface features that are native to the first platform; and
wherein execution of the second set of instructions causes the devices that provide the second platform to load the content into the layers and to display the content in the layers using user interface features that are native to the first platform wherein generating the first set of computer-executable instructions comprises compiling a first set of platform-specific code, the first set of platform-specific code being specific to the first platform; and wherein generating the second set of computer-executable instructions comprise compiling a second set of platform-specific code, the second set of platform-specific code being specific to the second platform, wherein generating the first set of computer-executable instructions comprises corn layer source code, the layer source code not containing code specific to the first platform or the second platform, the layer source code defining a layer class that comprises a load operation that loads content into a layer module, the layer module being an instance of the layer class; wherein generating the second set of computer-executable instructions comprises compiling the layer source code; wherein the first set of platform-specific code defines an operation that, when executed on the first platform, uses the layer module to generate output data usable to present a layer to a user; and wherein the second set of platform-specific code defines an operation that, when executed on the second platform, uses the layer module to generate output data usable to present the layer to another user.

* * * * *